United States Patent [19]

Kim et al.

[11] Patent Number: 5,200,795
[45] Date of Patent: Apr. 6, 1993

[54] PASSIVE QUADRATURE PHASE DETECTION SYSTEM FOR COHERENT FIBER OPTIC SYSTEMS

[75] Inventors: Byoung Y. Kim, Menlo Park, Calif.; Hee G. Park, Junggu, Rep. of Korea; Shangyuan Huang, Shanghai, China

[73] Assignee: The Board of Trustees of the Leland Stanford Junior University, Stanford, Calif.

[21] Appl. No.: 401,175

[22] Filed: Aug. 31, 1989

[51] Int. Cl.[5] ............................................. G01B 9/02
[52] U.S. Cl. .................................. 356/345; 356/351; 250/227.27
[58] Field of Search ............................. 356/345, 351; 250/327.19, 227.27

[56] References Cited

U.S. PATENT DOCUMENTS

| | | |
|---|---|---|
| 4,283,144 | 8/1981 | McLandrich . |
| 4,352,563 | 10/1982 | McLandrich . |
| 4,609,290 | 9/1986 | Cahill ............................. 356/351 X |
| 4,828,350 | 5/1989 | Kim et al. . |
| 4,915,468 | 4/1990 | Kim et al. . |

FOREIGN PATENT DOCUMENTS

| | | |
|---|---|---|
| 0254231 | 1/1988 | European Pat. Off. . |
| 0268741 | 6/1988 | European Pat. Off. . |
| 2176364 | 12/1986 | United Kingdom . |
| 2207236 | 1/1989 | United Kingdom . |
| 2217010 | 10/1989 | United Kingdom . |
| 2218505 | 11/1989 | United Kingdom . |

OTHER PUBLICATIONS

Jackson et al., "Elimination of Drift in a Single-Mode Optical Fiber Interferometer Using a Piezoelectrically Stretched Coiled Fiber", Applied Optics, vol. 19, No. 17, Sep. 1, 1970, pp. 2926–2929.

Cole et al., "Synthetic-Heterodyne Interferometric Demodulation", IEEE Journal of Quantum Electronics, vol. QE-18, No. 4, Apr. 1982, pp. 694–697.

Kim et al., "Phase-Reading, All-Fiber-Optic Gyroscope", Optics Letters, vol. 9, No. 8, Aug. 1984, pp. 378–380.

Niemeier et al., "Quadrature Outputs from Fiber Interferometer with 4×4 Coupler", Optics Letters, vol. 11, No. 10, pp. 677–679, Oct. 1986.

Sheem, "Fiber-Optic Gyroscope with [3×3] Directional Coupler", Applied Physics Letters, 37 (10), Nov. 15, 1980, pp. 869–871.

Stowe et al., "Demodulation of Interferometric Sensors Using a Fiber-Optic Passive Quadrature Demodulator", Journal of Lightwave Technology, vol. LT-1, No. 3, Sep. 1983.

Sorin et al., "Highly Selective Evanescent Modal Filter for Two-Mode Optical Fibers", Optics Letters, vol. 11, No. 9, Sep. 1986, pp. 581–583.

Kim et al., "Use of Highly Elliptical Core Fibers for Two-Mode Fiber Devices", Optics Letters, vol. 12, No. 9, pp. 729–731, Sep. 1987.

Siegman, Lasers, University Science Books, Mill Valley, Ca., Chapter 17, pp. 682–685, Dec. 1986.

Youngquist et al., "All-Fibre Components Using Periodic Coupling", IEE Proceedings, vol. 132, Pt. J. No. 5, Oct. 1985, pp. 277–286.

Youngquist et al., "Two-Mode Fiber Modal Coupler", Optics Letters, vol. 9, No. 5, May 1984, pp. 177–179.

Blake et al., "Fiber-Optic Modal Coupler Using Periodic Microbending", Optics Letters, vol. II, no. 3, Mar. 1986, pp. 177–179.

Kim et al., "All-Fiber Acousto-Optic Frequency Shifter", Optics Letters, vol. 11, No. 6, Jun. 1986, pp. 389–391.

Blake et al., "All-Fiber Acousto-Optic Frequency Shifter Using Two-Mode Fiber", Proceedings of the SPIE, vol. 719, Dec. 1986.

Blake et al., "Strain Effects on Highly Elliptical Core Two-Mode Fibers", Optics Letters, vol. 12, pp. 732–734, Sep. 1987.

Yarin, Quantum Electronics, 2nd Ed., John Wiley, New York, Dec. 1975, pp. 118–119.

Kavovsky, "Phase and Polarization Diversity Coherent Optical Techniques", Journal of Lightwave Technology, vol. 7, No. 2, Feb. 1989, pp. 279–292.

*Primary Examiner*—Samuel A. Turner
*Attorney, Agent, or Firm*—Knobbe, Martens, Olson & Bear

[57] ABSTRACT

A passive quadrature phase detection system for coherent fiber systems includes first and second optical detectors positioned to receive an output signal from the output end of an optical signal apparatus such as an interferometer, or the like. The optical signal from the apparatus includes light propagating in two propagation modes. As the light propagates away from the output end of the apparatus from the near field to the far field, the light in the two modes undergoes a relative phase shift of $\pi/2$ in accordance with the Guoy effect. The two detectors are positioned such that the first detector detects the intensity of light resulting from the interference between the two modes in the near field of the output signal, and such that the second detector detects the intensity of light resulting from the interference between the two modes in the far field of the output signal. The additional $\pi/2$ phase difference introduced between the two modes as the light propagates from the near field light to the far field causes the detected light intensities to be in phase quadrature. Electrical signals proportional to the detected light intensities can be processed to determine changes in the phase difference between the two modes within the apparatus. In preferred embodiments, the detection of the near field light intensity is accomplished at a position optically displaced from the output end of the apparatus.

20 Claims, 9 Drawing Sheets

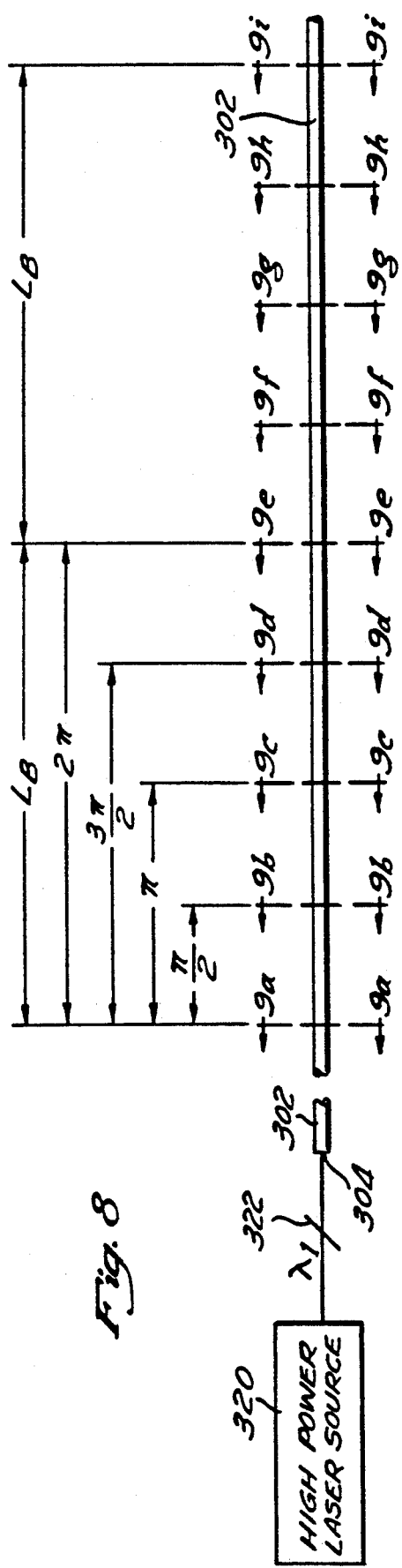
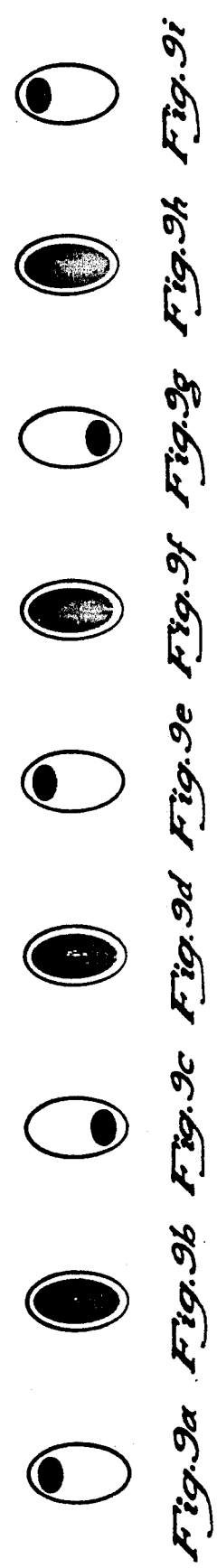

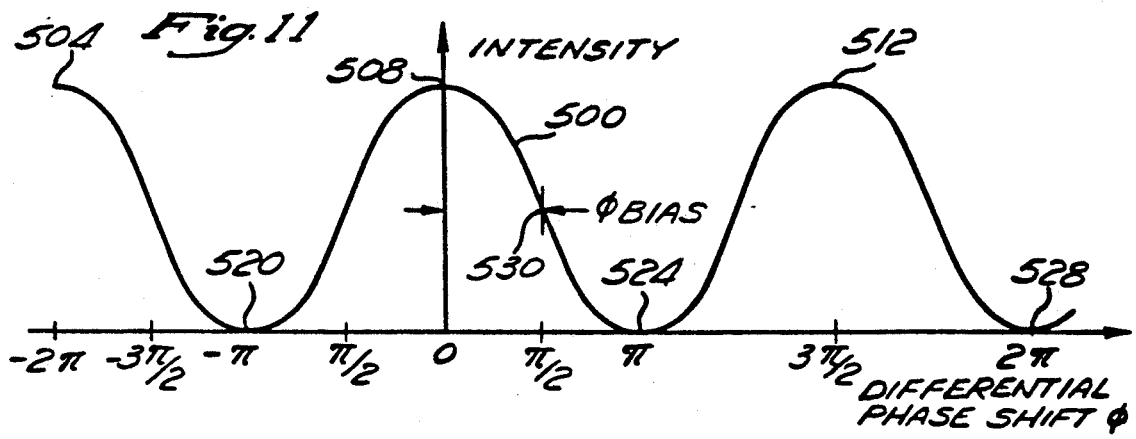
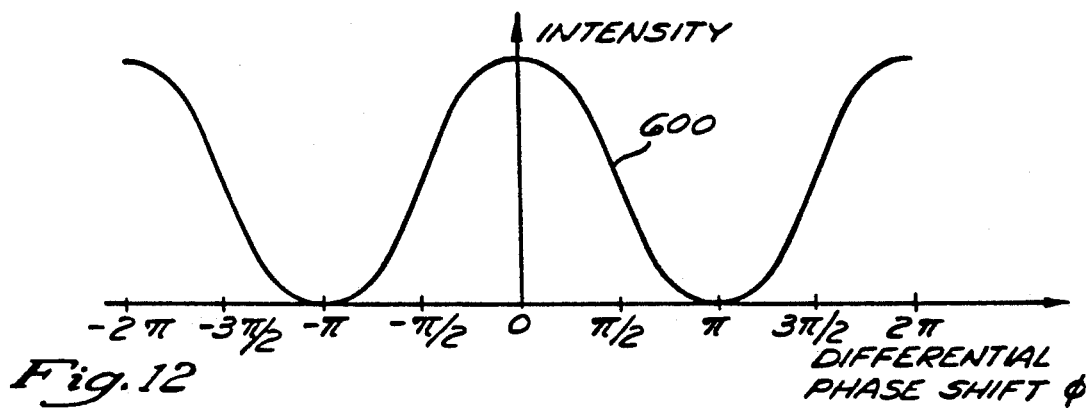
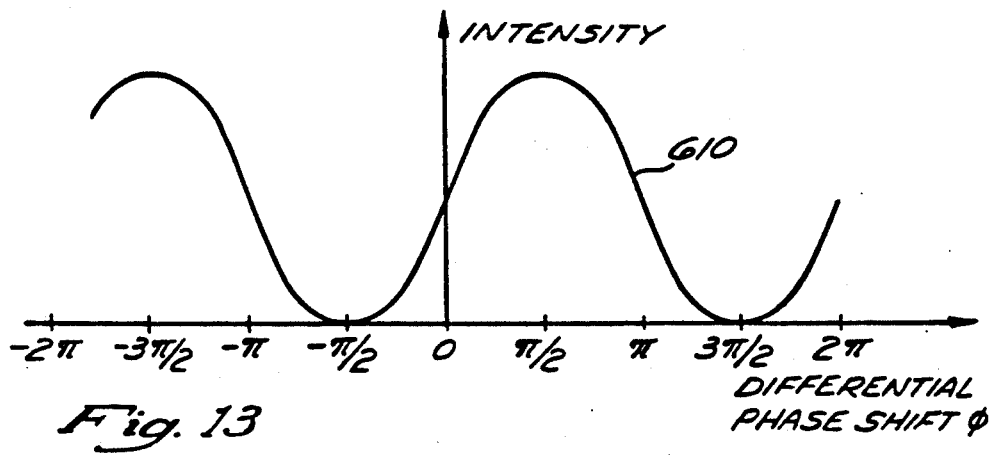

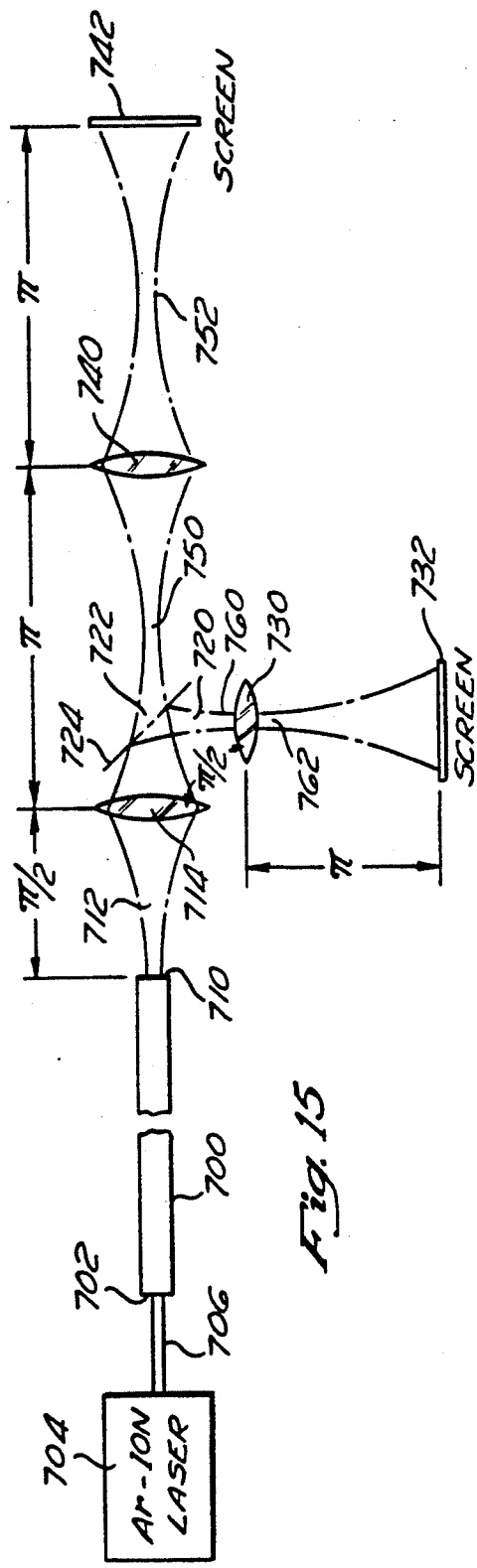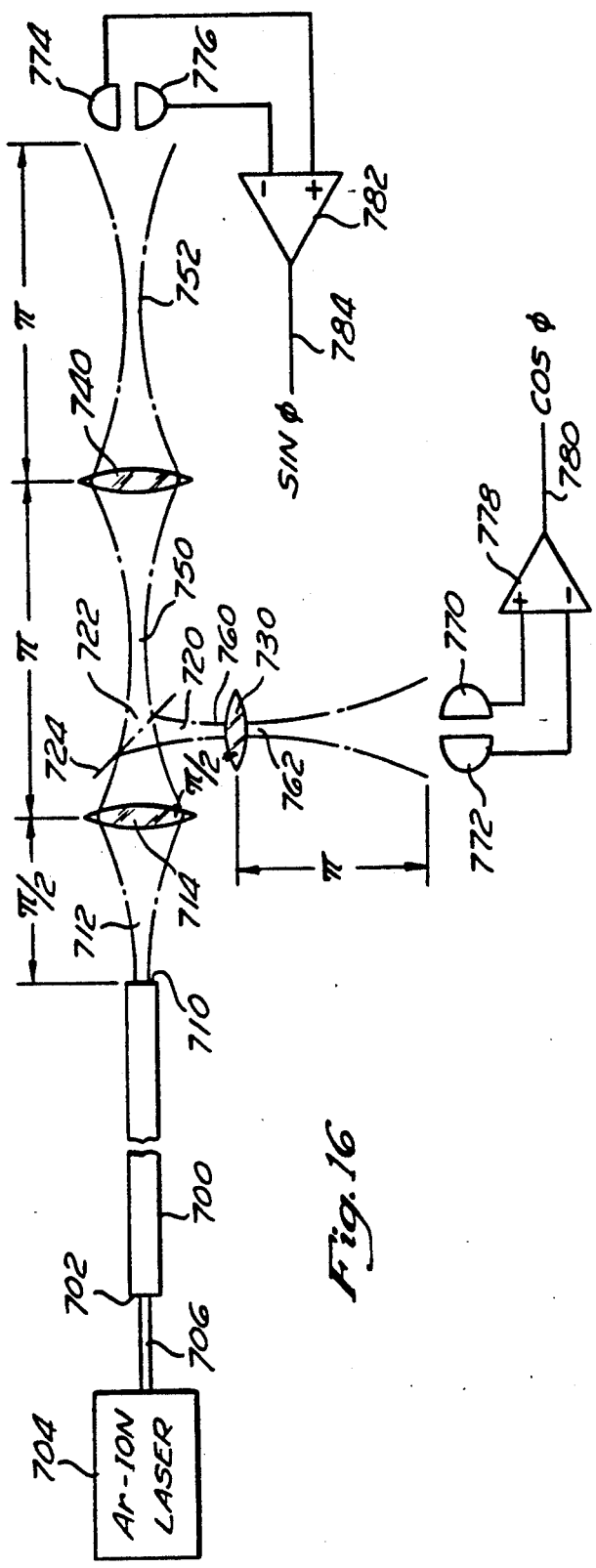
Fig. 15
Fig. 16

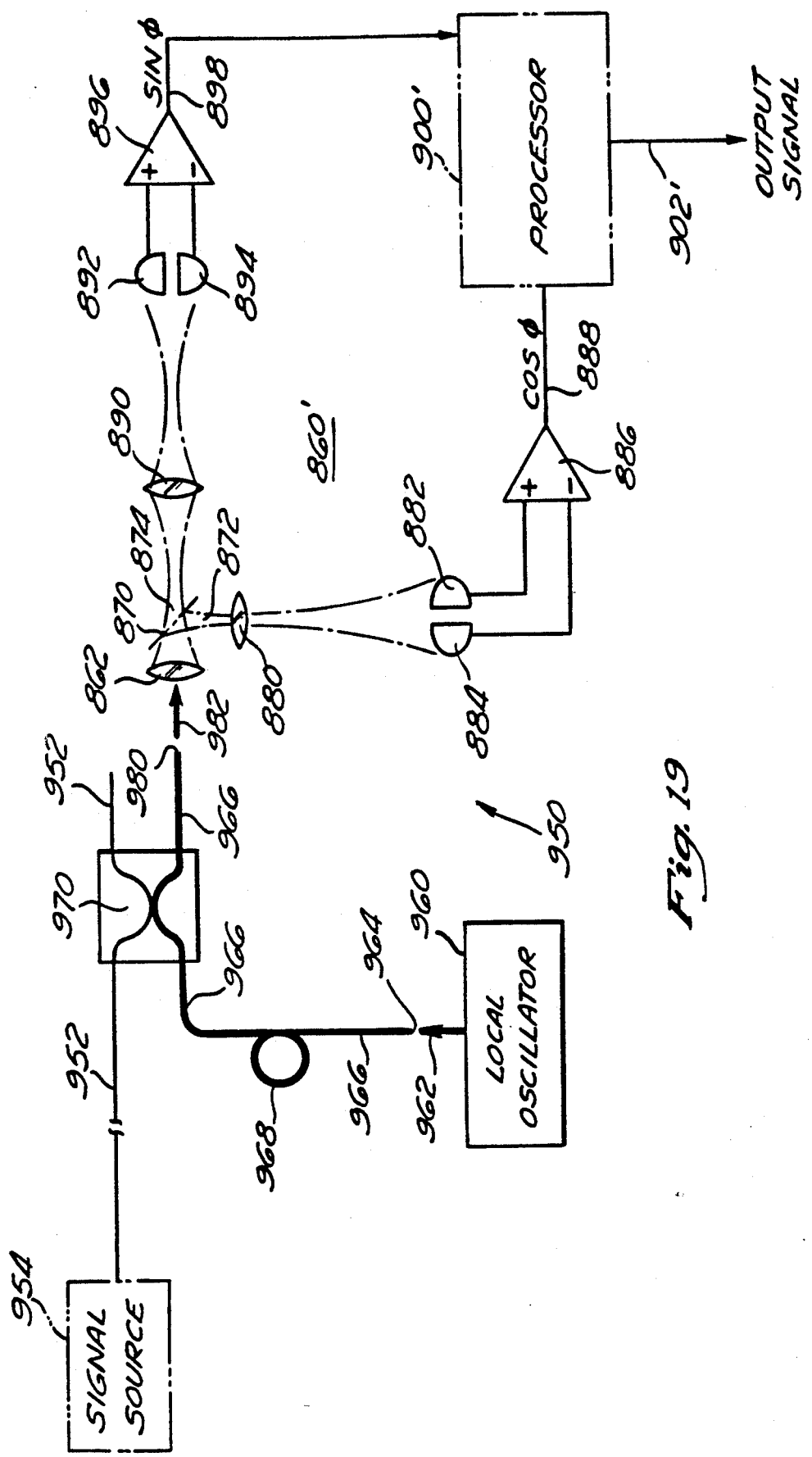

PASSIVE QUADRATURE PHASE DETECTION SYSTEM FOR COHERENT FIBER OPTIC SYSTEMS

BACKGROUND OF THE INVENTION

1. Field of the Invention

The present invention is in the field of coherent fiber optic systems that detect the phase difference between two interfering light waves in sensing applications and in telecommunications applications.

2. Description of the Related Art

In coherent fiber-optic systems for sensing and telecommunications applications, there is a well known signal fading problem that results in low sensitivity and instability. Briefly, such systems operate by detecting the intensity of an optical output signal produced by the interference of two optical waves travelling in two optical propagation paths. For example, in rotation sensors comprising a loop of optical fiber, two counter-propagating optical signals are combined such that they interfere and produce an optical output signal having an intensity that varies in accordance with the rotation rate of the loop. The intensity of the combined optical output signal depends upon the relative phase difference between the two optical waves. The optical phase difference is a result of phase biasing caused, for example, by the parameter to be sensed (e.g., rotation) in a sensing application, or by signal information in a telecommunications application. The optical phase difference is further sensitive to environmental parameters that introduce additional phase differences. This problem is particularly acute when the phase difference between the two interfering waves is very close to an integer multiple of $\pi$ (i.e., $N\pi$, where N is 0, 1, 2, 3, etc.)

Several approaches have been devised to overcome the above-described signal fading problem. For example, D. A. Jackson, et al., "Elimination of drift in a single-mode optical fiber interferometer using a piezoelectrically stretched coiled fiber," *APPLIED OPTICS*, Vol. 19, No. 17, 1 September 1980, pp. 2926–2929, describes a servo driven piezoelectrically stretched coiled fiber for maintaining a single-mode optical fiber interferometer in quadrature to actively stabilize the phase bias. James H. Cole, et al., "Synthetic-Heterodyne Interferometric Demodulation," *IEEE JOURNAL OF QUANTUM ELECTRONICS*, Vol. QE-18, No. 4, April 1982, pp. 694–697, and B. Y. Kim, et al., "Phase-reading, all-fiber-optic gyroscope," *OPTICS LETTERS*, Vol. 9, No. 8, August 1984, pp. 378–380, describe systems that use heterodyning to overcome the signal fading problem. Th. Niemeier, et al., "Quadrature outputs from fiber interferometer with 4×4 coupler," *OPTICS LETTERS*, Vol. 11, No. 10, October 1986, pp. 677–679; Sang K. Sheem, "Fiber-optic gyroscope with [3×3] directional coupler," *Applied Physics Letters*, Vol. 37, No. 10, 15 November 1980, pp. 869–871; and David W. Stowe, et al., "Demodulation of Interferometric Sensors Using a Fiber-Optic Passive Quadrature Demodulator," *JOURNAL OF LIGHTWAVE TECHNOLOGY*, Vol. LT-1, No. 3, September 1983, pp. 519–523, describe passive devices that produce quadrature phase information on the optical output signals. For example, in the Stowe, et al., article, two interferometers are constructed such that when one interferometer is operating at its minimum sensitivity, the other interferometer is operating at its maximum sensitivity. The present invention provides a new approach to the generation of signals that provide quadrature phase information to overcome the signal fading problem.

SUMMARY OF THE INVENTION

An optical fiber having a highly elliptical core geometry is operated as a two-mode optical fiber that supports only the fundamental symmetric $LP_{01}$ mode and the second order antisymmetric $LP_{11}$ mode with a stable cross-sectional mode intensity distribution. As the two modes propagate along the fiber, a differential phase shift accumulates between the two modes due to the difference in their propagation constants. When both the $LP_{01}$ and the $LP_{11}$ modes are excited with approximately equal intensity, the output radiation pattern from the two-mode optical fiber varies as a function of the phase difference between the two modes. Detection of one of the upper half of the radiation pattern or the lower half of the radiation pattern provides an intermodal interference signal from which the differential phase shift between the optical waves in the $LP_{01}$ and the $LP_{11}$ modes can be determined. Alternatively, and preferably, the two halves are differentially detected to obtain the intermodal interference signal. Two interference signals are detected. One of the detected signals corresponds to the near field radiation pattern emitted from the end face of the two-mode optical fiber and the other detected signal corresponds to the far field radiation pattern. In accordance with a little known phenomenon referred to as the "Guoy effect", a $\pi/2$ differential phase shift is introduced between the light corresponding to the near field pattern and the light corresponding to the far field pattern. Thus, the two detected signals are at quadrature such that when one detected signal has minimum sensitivity to the differential phase shift to be measured, the other detected signal has maximum sensitivity and vice versa. The two quadrature phase signals, which are proportional to the sine of the differential phase shift and the cosine of the differential phase shift, respectively, are processed using conventional techniques to produce a non-fading signal regardless of the value of any phase bias introduced by the environment, etc.

The present invention can be advantageously used in interferometers. It can further be used to eliminate signal fading in a coherent homodyne communication system with a local oscillator operating at the same frequency as the incoming signal in a single mode fiber. In the communication system, light from the local oscillator is coupled to the $LP_{01}$ mode of a two-mode optical fiber and unwanted excitation of the $LP_{11}$ mode is eliminated by a mode stripper. The incoming signal is coupled to the $LP_{11}$ mode of the two-mode optical fiber through a mode selective directional coupler, resulting in an inter-modal interferometer in the two-mode optical fiber. The output of the two-mode optical fiber is detected using the detection system of the present invention.

BRIEF DESCRIPTION OF THE DRAWINGS

The above-described features and other features of the present invention will be described in more detail below in connection with the drawing figures, in which:

FIG. 8 illustrates a portion of the two-mode optical fiber of FIG. 7.

FIGS. 9a-9i illustrate cross sections of the electrical field intensity patterns taken at locations 9a-9a, 9b-9b, etc. in FIG. 8.

FIG. 11 illustrates the output intensity from the interferometer of FIG. 10 caused by the interference between the light in the $LP_{01}$ mode and the light in the $LP_{11}$ mode, showing the signal fading problem at phase differences close to zero and multiples of $\pm N\pi$ and further showing the effect of phase bias to reduce the signal fading problem.

FIGS. 12 and 13 illustrate two signals that are in phase quadrature with each other such that one signal is shifted in phase with respect to the other signal by $\pi/2$.

FIG. 15 illustrates the basic principles of the passive quadrature phase detector of the present invention wherein the output intensity patterns are displayed on screens positioned at locations where the intensity patterns correspond to the near field and far field intensity patterns.

FIG. 16 illustrates the passive quadrature phase detector of FIG. 15 with detectors positioned in the near field and the far field of the optical output to generate electrical output signals responsive to the intensities of the light in the near field and the far field.

FIG. 19 illustrates the quadrature phase detector of the present invention incorporated into a homodyne communications receiver system.

DETAILED DESCRIPTION OF THE PREFERRED EMBODIMENTS

The present invention utilizes an optical waveguide that operates at a wavelength below cutoff such that the waveguide supports both fundamental and second order guided modes. The fundamental and second order guided modes provide two orthogonal paths through the optical waveguide which permits the device to be used as a two-channel optical propagation medium. The embodiments of the present invention utilize an optical waveguide having the geometry of the core selected so that only the fundamental mode and one stable spatial orientation of the second order is supported in the waveguide.

Before discussing the specific embodiments of the present invention, a detailed description of the optical waveguide and a brief summary of the applicable mode theory will be presented to provide a more complete understanding of the invention. Although described below in connection with a silica glass optical fiber waveguide, one skilled in the art will understand that the concepts presented are also applicable to other optical waveguides, such as a $LiNbO_3$ optical fiber, integrated optics, or the like.

Mode Theory

Figure 1:
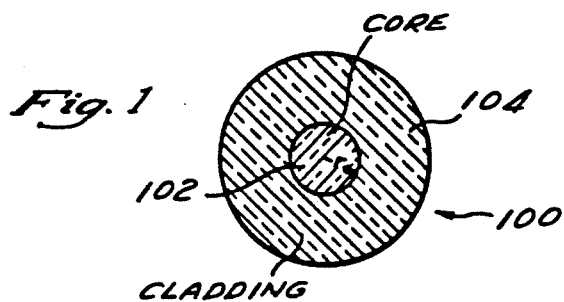
FIG. 1 is a cross-sectional view of an exemplary circular core optical fiber.

An exemplary cross section of a silica glass optical fiber 100 is illustrated in FIG. 1. The fiber 100 comprises an inner core 102 and an outer cladding 104. The inner core 102 has a radius of r. In the exemplary fiber 100, the core has a refractive index $n_{co}$ and the cladding has a refractive index $n_{cl}$. As is well known in the art, the core refractive index $n_{co}$ is greater than the cladding index $n_{cl}$ so that an optical signal propagating in the optical fiber 100 is well-guided. The number of modes guided by the optical fiber 100 depends upon the fiber geometry and upon the wavelength of the optical signal propagating therethrough. Typically, the wavelength above which an optical fiber will propagate only the fundamental or first order mode is referred to as the "second order mode cutoff" wavelength $\lambda_c$, which may be calculated for a circular core fiber utilizing the following equation:

$$\lambda_c = \frac{2\pi r \sqrt{n_{co}^2 - n_{cl}^2}}{2.405} \tag{1}$$

If the wavelength of the optical signal is greater than the wavelength $\lambda_c$ (i.e., the frequency of the optical signal is less than a cutoff frequency), only the first order or fundamental propagation mode of the optical signal will be well-guided by the fiber and will be propagated by the fiber. If the wavelength of an optical signal is less than $\lambda_c$ (i.e., the frequency of the optical signal is greater than the cutoff frequency), higher order modes, such as the second order modes, will begin to propagate.

The true first and second order modes of a circular core optical fiber and their respective electric field amplitude distributions are illustrated in FIGS. 2a-2h. The two first order modes are the vertically polarized $HE_{11}$ mode represented by an electric field pattern 10 in FIG. 2a, and the horizontally polarized $HE_{11}$ mode, represented by an electric field pattern 112 in FIG. 2b. The outer circle in each figure represents the boundary of the core 102 of the fiber 100 of FIG. 1.

Figures 2A, 2B, 2C:
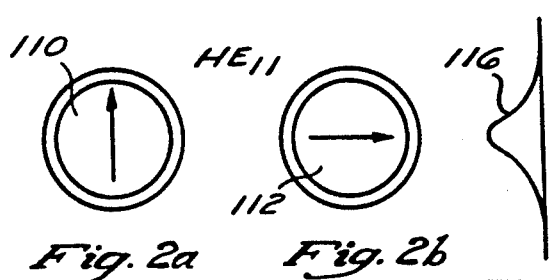
FIGS. 2a and 2b illustrate the electric field distribution patterns for the vertically polarized and horizontally polarized $HE_{11}$ (fundamental) propagation modes of the circular core optical fiber of FIG. 1.
FIG. 2c is a graph of the electric field amplitude distribution corresponding to the field distribution patterns of FIGS. 2a and 2b.

As illustrated in FIG. 2c, the $LP_{01}$ modes have an electric field amplitude distribution 116 that is substantially symmetrical around the centerline of the core 102. The electric field amplitude distribution 116 is concentrated in the center of the core 102 and decreases as the distance from the center of the core 102 increases. A small portion of the electric field amplitude distribution 116 often extends beyond the boundaries of the core. This extended electric field is commonly referred to as the evanescent field of the guided modes.

The four true second order modes are illustrated in FIGS. 2d-2g. These four true modes are distinguished by the orientation of the transverse electric field, denoted by the directions of the arrows in FIGS. 2d-2g, and are commonly referred to as the $TE_{01}$ mode, represented by an electric field pattern 120 in FIG. 2d; the $TM_{01}$ mode, represented by an electric field pattern 122 in FIG. 2e; the $HE_{21}$ even mode, represented by an electric field pattern 124 in FIG. 2f; and the $HE_{21}$ odd mode, represented by an electric field pattern 126 in FIG. 2g.

Figures 2F, 2G, 2H:
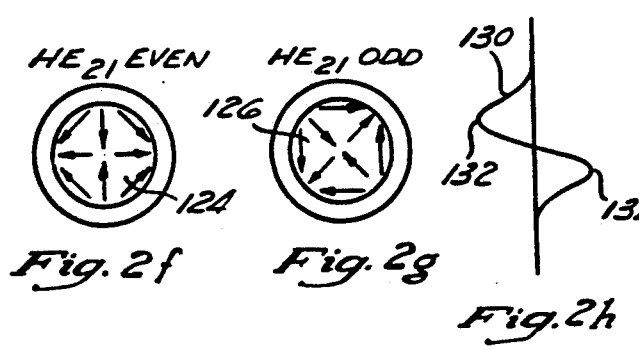
FIG. 2h is a graph of the electric field amplitude distribution patterns for the second order modes of the optical fiber of FIG. 1.

An electric field amplitude distribution 130 for an exemplary optical signal propagating in the second order modes is illustrated in FIG. 2h. As illustrated, the electric field amplitude distribution 130 is substantially equal to zero at the centerline of the core, and has two maximum amplitudes 132 and 134 near the boundary of the core. As further illustrated, the two amplitude maxima 132 and 134 are 180° out of phase. Further, a greater portion of the electric field distribution extends beyond the boundary of the core in the second order modes, thus providing a larger evanescent field than for the $HE_{11}$ modes.

Each of the four true second order modes has a slightly different propagation velocity from the other of the four second order modes. Thus, when one or more of the true second order modes are co-propagating in a two-mode fiber, the intensity distribution of the second order mode varies as a function of the length of the fiber as a result of changes in the phase differences between the four modes as they propagate. The cross-sectional intensity distribution of the second order mode changes in response to environmental changes that induce differential phase shifts between the almost degenerate four modes.

In order to more easily analyze the characteristics of optical signals propagating in the second order propagation modes, the characteristics of the modes are analyzed using the LP approximations for the modes defined and described in detail in D. Gloge, "Weakly Guiding Fibers," *Applied Optics.* Vol. 10, No. 10, October 1971, pp. 2252-2258.

A better understanding of the mode theory of optical propagation in an optical fiber or other circular core waveguide can be obtained by referring to FIGS. 3a-3f, and wherein the first and second modes are represented in accordance with the LP approximations described by Gloge in his paper. The outer circles in each of the illustrations again represent the cross section of the core 102 of the optical fiber 100 of FIG. 1. The outlines within the core circles represent the electric field distributions. Arrows with the inner outlines represent the direction of polarization.

Figures 3A, 3B:
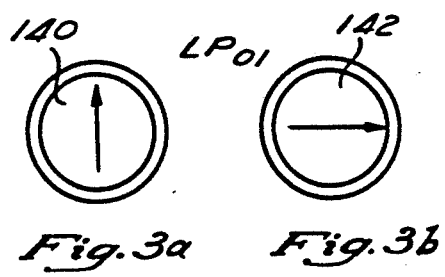
FIGS. 3a and 3b illustrate the $LP_{01}$ approximations for the first order propagation modes of the optical fiber of FIG. 1.
Figures 2D, 2E:
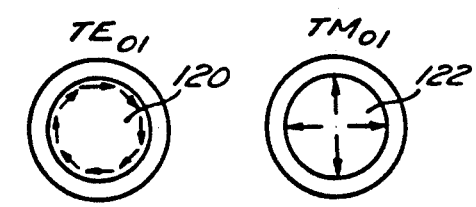
FIGS. 2d, 2e, 2f and 2g illustrate the electric field distribution patterns for the $TE_{01}$, $TM_{01}$, even $HE_{21}$ and odd $HE_{21}$ (second order) propagation modes, respectively, of the circular core optical fiber of FIG. 1.

FIGS. 3a-3b show the field patterns of the two polarization modes in the fundamental $LP_{01}$ set of modes. A field pattern 140 in FIG. 3a represents vertically polarized light in the $LP_{01}$ fundamental mode, and a field pattern 142 in FIG. 3b represents horizontally polarized light in the fundamental $LP_{01}$ mode.

Figures 3C, 3D:
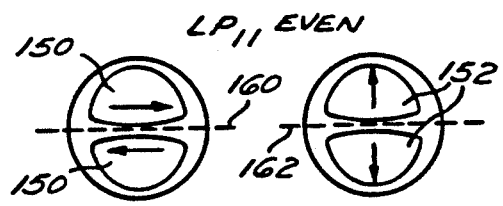
FIGS. 3c, 3d, 3e and 3f illustrate the $LP_{11}$ approximations for the second order propagation modes of the optical fiber of FIG. 1.
Figures 3E, 3F:
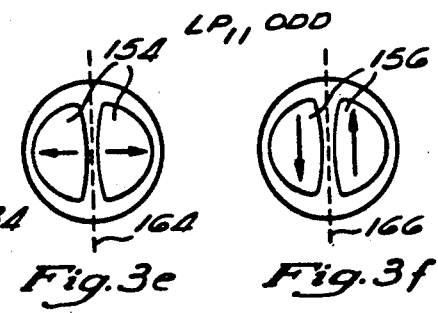

FIGS. 3c-3f illustrate the $LP_{11}$ approximations for the second order modes. As illustrated in FIGS. 3c-3f, there are four $LP_{11}$ modes, each having two lobes for the electric field distribution. Two of the modes, represented by an $LP_{11}$ mode pattern 150 in FIG. 3c and an $LP_{11}$ mode pattern 152 in FIG. 3d, are referred to herein as the $LP_{11}$ even modes. The other two $LP_{11}$ modes, represented by an $LP_{11}$ mode pattern 154 in FIG. 3e and an $LP_{11}$ mode pattern 156 in FIG. 3f, are referred to as the $LP_{11}$ odd modes. The four $LP_{11}$ modes are distinguished by the orientation of the lobe patterns and the orientation of the electric field vectors (i.e., the polarization vectors) within the lobe patterns. For example, the first $LP_{11}$ even mode field pattern 150 (FIG. 3c) has two lobes that are symmetrically located about a horizontal zero electric field line 160. Within the two lobes, the electric field vectors are parallel to and antisymmetric about the zero electric field line 160. For convenience, the $LP_{11}$ mode represented by the lobe pattern 150 will be referred to as the horizontally polarized $LP_{11}$ even mode.

The second $LP_{11}$ even lobe pattern 152 (FIG. 3d) is symmetrically located about a horizontal zero electric field line 142. Within the two lobes of the field pattern 152, the electric field vectors are perpendicular to and antisymmetric about the zero electric field line 162. The $LP_{11}$ mode represented by the electric field pattern 152 will be referred to as the vertically polarized $LP_{11}$ even mode.

The first $LP_{11}$ odd mode field pattern 154 has two lobes that are symmetrically located about a vertically oriented zero electric field line 164. Within the two lobes, the electric field vector is perpendicular to and antisymmetric about the zero electric field line 164, and are thus oriented horizontally. The $LP_{11}$ mode represented by the field pattern 154 will thus be referred to as the horizontally polarized $LP_{11}$ odd mode.

The electric field pattern 156 of the second $LP_{11}$ odd mode has two lobes that are symmetrically located about a vertically oriented zero electric field line 166. Within the two lobes, the electric field vectors are parallel to and antisymmetric about the zero electric field line 166. Thus, the $LP_{11}$ mode represented by the electric field pattern 156 will be referred to as the vertically polarized $LP_{11}$ odd mode.

In the LP-mode approximations, each of the six electric field patterns in FIGS. 3a-3f, namely the two $LP_{01}$ patterns and the four $LP_{11}$ patterns, are orthogonal to each other. In other words, in the absence of perturbations to the optical waveguide, there is substantially no coupling of optical energy from one of the field patterns to any of the other field patterns. Thus, the six electric field patterns may be viewed as independent optical paths through the optical waveguide, which ordinarily do not couple with each other.

If the indices of the core 102 and the cladding 104 of the optical fiber 100 are approximately equal, the two $LP_{01}$ modes will travel through the fiber at approximately the same propagation velocity, and the four second order $LP_{11}$ modes will travel through the fiber at approximately the same propagation velocity. However, the propagation velocity for the fundamental $LP_{01}$ set of modes will be slower than the propagation velocity for the second order $LP_{11}$ set of modes. Thus, the two sets of modes, $LP_{01}$ and $LP_{11}$, will move in and out of phase with each other as the light propagates through the fiber. The propagation distance required for the two sets of modes to move out of phase by 360° (i.e., $2\pi$ radians) is commonly referred to as the beat length of the fiber, which may be mathematically expressed as:

$$L_B = \frac{\lambda}{\Delta n} = \frac{2\pi}{\Delta \beta} \qquad (2)$$

where $L_B$ is the beat length, $\lambda$ is the optical wavelength in a vacuum, $\Delta n$ is the difference in the effective refractive indices of the two sets of modes, and $\Delta \beta$ is the difference in the propagation constants for the two sets of modes.

It has been previously shown that coherent power transfer between the two sets of the modes, $LP_{01}$ and $LP_{11}$, can be achieved by producing periodic perturbations in the optical fiber that match the beat length of the two modes. A number of optical devices have been constructed to control the coupling of optical energy between the two modes to provide useful devices for selective coupling, filtering and frequency shifting of an optical signal. See, for example, W. V. Sorin, et al., "Highly selective evanescent modal filter for two-mode optical fibers," OPTICS LETTERS, Vol. 11, No. 9, September 1986, pp. 581-583; R. C. Youngquist, et al., "All-fibre components using periodic coupling," IEEE Proceedings, Vol. 132, Pt. J, No. 5, October 1985, pp. 277-286; R. C. Youngquist, et al., "Two-mode fiber modal coupler," OPTICS LETTERS, Vol. 9, No. 5, May 1984, pp. 177-179; J. N. Blake, et al., "Fiber-optic modal coupler using periodic microbending," OPTICS LETTERS, Vol. 11, No. 3, March 1986, pp. 177-179; B. Y. Kim, et al., "All-fiber acousto-optic frequency shifter," OPTICS LETTERS, Vol. 11, No. 6, June 1986, pp. 389-391; and J. N. Blake, et al., "All-fiber acousto-optic frequency shifter using two-mode fiber," Proceedings of the SPIE, Vol. 719, 1986. The present invention provides substantial improvement to many of those devices and provides a number of new devices that utilize coupling between the modes to further control an optical signal.

Although the four $LP_{11}$ modes provide four orthogonal channels for the propagation of optical energy through an optical fiber or other waveguide, it has often been found to be difficult to fully utilize the four channels independently. As set forth above, the $LP_{11}$ modes are approximations of real modes and are nearly degenerate in a circular core fiber 100. This makes the $LP_{11}$ modes very sensitive to couplings caused by perturbations in the optical fiber, such as bending, twisting and lateral stressing. Furthermore, since the $LP_{11}$ modes are only an approximation of the real modes, there will be a slight amount of coupling even in the absence of perturbations of the fiber 100. The net result is that the propagation of an $LP_{11}$ mode electric field pattern in a given mode is not stable. In like manner, the electric field patterns of the two $LP_{01}$ polarization modes are likewise unstable.

Figure 4:
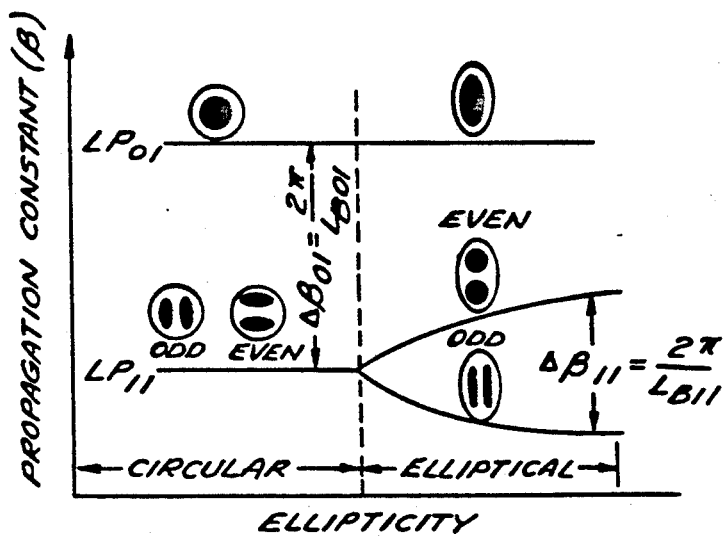
FIG. 4 is an unscaled graph of the propagation constant of an optical waveguide versus the ellipticity of the core of the optical waveguide.

It has been previously shown that the use of an elliptical core cross section in an optical fiber or other waveguide can introduce birefringence and separate the propagation constants for the two polarizations of the $LP_{01}$ first order mode. The separation of the propagation constants locks the polarization of the signal to a principle axis of the core cross section. It has also been shown that an elliptical core also increases the separation between the propagation constants of the $LP_{11}$ mode patterns. This tends to enhance modal stability. This is illustrated in FIG. 4 which is an unscaled representation of the propagation constant $\beta$ versus the ellipticity of the core of an optical waveguide. As illustrated, the $LP_{01}$ propagation mode has a larger propagation constant than the $LP_{11}$ propagation mode. From Equation (2), this difference in the propagation constants is related to the beat length LB between the $LP_{01}$ and $LP_{11}$ propagation modes as follows:

$$\Delta \beta_{01} = \frac{2\pi}{L_{B01}} \qquad (3)$$

where $\Delta \beta_{01}$ is the difference in the propagation constants between the $LP_{01}$ mode and the $LP_{11}$ mode, and $L_{B01}$ is the beat length between the $LP_{01}$ and $LP_{11}$ modes.

As illustrated in the left-hand portion of FIG. 4, when the core of the optical waveguide is substantially circular, the $LP_{11}$ odd and even modes have substantially the same propagation constant. However, when the core of the optical waveguide is elliptical, the propagation constants of the odd and even $LP_{11}$ modes are different. This is illustrated by the propagation constant difference $\Delta \beta_{11}$ in the right half of FIG. 4. As illustrated, the difference in the propagation constants of the odd and even $LP_{11}$ modes ($\Delta \beta_{11}$) increases as the ellipticity increases. The use of an elliptical core optical fiber has been suggested as a means of avoiding the degeneracy of the orthogonal lobe orientations of the $LP_{11}$ modes. See, for example, J. N. Blake, et al., "All-fiber acousto-optic frequency shifter using two-mode fiber," Proceedings of the SPIE, Vol. 719, 1986.

The foregoing differences in the propagation constants between the $LP_{01}$ mode and the odd and even $LP_{11}$ modes when the core of the optical fiber is elliptical, also results in a change in the cutoff wavelength and the corresponding cutoff frequency. For example, for a circular core optical fiber, the cutoff wavelength is related to the radius of the fiber core, as set forth in Equation (1) above. Thus, optical signals having wavelengths above the second order mode cutoff wavelength $\lambda_c$ (i.e., frequencies below the second order mode cutoff frequency) will not propagate in the second order or higher modes in the optical fiber. Optical signals having wavelengths less than the cutoff wavelength $\lambda_c$ will propagate in the second order modes. If the wavelength is further educed to a wavelength $\lambda_{c2}$, third order and higher modes will be supported by the optical waveguide. For a circular core optical waveguide, $\lambda_{c2}$ can be found by the following equation:

$$\lambda_{c2} = \frac{2\pi r \sqrt{n_{co}^2 - n_{cl}^2}}{3.832} \quad (4)$$

where r, $n_{co}$ and $n_{cl}$ are as set forth above for Equation (1). One skilled in the art will understand that the foregoing can also be represented by cutoff frequencies. For example, the first cutoff wavelength $\lambda_c$ corresponds to first cutoff frequency $f_c$, and the second cutoff wavelength $\lambda_{c2}$ corresponds to a second cutoff frequency $f_{c2}$ that is greater than the first cutoff frequency $f_c$. Specifically, for the circular core optical waveguide, if the first cutoff frequency $f_c$ is normalized to 2.405, the second cutoff frequency $f_{c2}$ will be normalized to 3.832. In other words, the second cutoff frequency will be 1.59 times greater than the first cutoff frequency (e.g., $f_{c2}/f_c = 3.832/2.405 = 1.59$). Thus, an optical signal having a normalized frequency less than 2.405 will propagate in the optical waveguide only n the $LP_{01}$ mode. An optical signal having a normalized frequency in the range of 2.405 to 3.832 will also propagate in the second order $LP_{11}$ mode. An optical signal having a normalized frequency greater than 3.832 will propagate in higher order modes.

The foregoing relationships also apply when the core of the optical waveguide is elliptical or has some other non-circular geometry. For example, Allan W. Snyder and Xue-Heng Zheng, in "Optical Fibers of Arbitrary Cross-Sections," *Journal of the Optical Society of America A*, Vol. 3, No. 5, May 1986, pp. 600–609, set forth the normalization factors for a number of different waveguide cross sections. For example, an elliptical core waveguide, having a major axis that is twice the length of the minor axis, will have a normalized cutoff frequency $f_c$ of 1.889 when the minor axis has the same length as the diameter of a corresponding circular core optical fiber of the same material construction. In other words, below the normalized frequency of 1.889, only the first order $LP_{01}$ modes will propagate. Similarly, Snyder and Zheng suggest that the $LP_{11}$ even mode will have a normalized cutoff frequency of 2.505, and the $LP_{11}$ odd mode will have a normalized cutoff frequency of 3.426.

Snyder and Zheng generalize the foregoing concept for an elliptical core optical waveguide with varying ratios between the length of the minor axis and the length of the major axis as follows:

$$f_c = 1.700(1 + (b/a)^2)^{\frac{1}{2}} \quad (5a)$$

$$f_{c2even} = 1.916(1 + 3(b/a)^2)^{\frac{1}{2}} \quad (5b)$$

$$f_{c2odd} = 1.916(3 + (b/a)^2)^{\frac{1}{2}} \quad (5c)$$

where $f_c$ is the normalized cutoff frequency for the $LP_{01}$ mode, below which optical energy will propagate only in the $LP_{01}$ mode in the elliptical core optical fiber; where $f_{c2even}$ is the normalized cutoff frequency for optical energy propagating in the $LP_{11}$ even mode, below which optical energy will propagate only in the $LP_{11}$ even mode but not in the $LP_{11}$ odd mode; and where $f_{c2odd}$ is the normalized cutoff frequency for the $LP_{11}$ odd mode, below which optical energy will propagate in the $LP_{11}$ odd mode as well as the $LP_{11}$ even mode, but not in any of the higher order modes; b is one-half the length of the minor axis of the elliptical core; and a is one-half the length of the major axis of the elliptical core. Equations (5a), (5b) and (5c) can be evaluated for an elliptical core fiber having a major axis length 2a of twice the minor axis length 2b to obtain the normalized frequencies 1.889, 2.505 and 3.426, set forth above. Equations (5a), (5b) and (5c) can be further evaluated for b=a (i.e., for a circular core) to obtain the $LP_{01}$ cutoff frequency of 2.405 and the $LP_{11}$ cutoff frequency of 3.832 for both the odd and even modes, as set forth above.

The foregoing properties of the elliptical core optical waveguide are advantageously utilized in the present invention to improve the operating characteristics of the optical waveguide by eliminating the $LP_{11}$ odd propagation mode and thus provide only one spatial orientation for the electric field pattern of the second order mode. This is illustrated in FIGS. 5 and 6a–6g.

Figures 5, 6A, 6B, 6C:
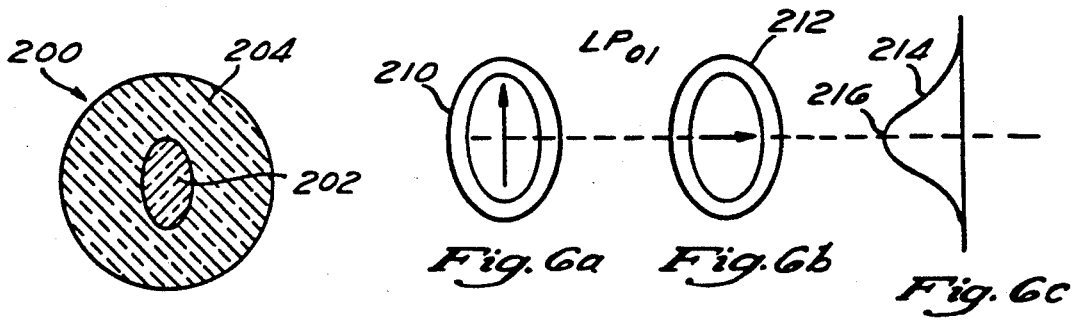
FIG. 5 is a cross-sectional view of an exemplary elliptical core.
FIGS. 6a and 6b illustrate the electric field patterns for the $LP_{01}$ (fundamental) propagation modes of the elliptical core optical fiber of FIG. 5.
FIG. 6c is a graph of the electric field amplitude distribution for the $LP_{01}$ propagation mode of the elliptical core optical fiber of FIG. 5.

FIG. 5 illustrates an exemplary optical fiber 200 having an elliptical core 202 and a surrounding cladding 204. The dimensions of the elliptical core 202 are selected so that the cutoff wavelengths and frequencies for the two orthogonal lobe patterns of the second order mode are well separated. An optical signal is applied to the fiber 200 that is within a frequency range selected to be above the cutoff frequency $f_{c2even}$ and to be below the cutoff frequency $f_{c2odd}$. For example, in an exemplary optical fiber having a first cutoff frequency $f_c$ that is normalized to 1.889, and a second frequency $f_{c2even}$ of 2.505, the frequency of the input optical signal is selected to have a normalized frequency in the range of 1.889 to 2.505. Thus, a light source is selected so that substantially all of the light produced by the light source has a normalized frequency that is substantially less than the second cutoff frequency that is substantially less than the second cutoff frequency $f_{c2even}$, and that has a substantial portion of the light that has a normalized frequency that is greater than the first cutoff frequency $f_c$. In terms of wavelength, substantially all of the light produced by the light source has one or more wavelengths that are greater than the second cutoff wavelength $\lambda_{c2even}$, and wherein a substantial portion of the light has at least one wavelength that is less than the first cutoff wavelength $\lambda_c$. Thus, the light entering the optical fiber is caused to propagate only in either the first order $LP_{01}$ mode or the $LP_{11}$ even mode. Since the frequency of the optical signal is selected to be less than the cutoff wavelength for the $LP_{11}$ odd mode, substantially no light The foregoing is illustrated in FIGS. 6a–6g. In FIGS. 6a and 6b, the two polarization modes for the $LP_{01}$ first order mode are illustrated. An electric field pattern 210 in FIG. 6a represents the electric field for the vertically polarized $LP_{01}$ mode, and an electric field pattern 212 in FIG. 6b represents the electric field for the horizontally polarized $LP_{01}$ mode. One skilled in the art will understand that the optical fiber 200 (FIG. 5) is birefringent for the first order $LP_{01}$ mode, and that the horizontally polarized $LP_{01}$ mode will propagate at a greater velocity than the vertically polarized $LP_{01}$ mode. An electric field amplitude distribution 214 for the $LP_{01}$ propagation modes is illustrated in FIG. 6c. As illustrated, the electric field amplitude distribution 214 is similar to the electric field amplitude distribution 116 in FIG. 2b, for a circular core fiber and has a peak amplitude 216 proximate to the centerline of the core 203.

Figures 6D, 6E, 6F:
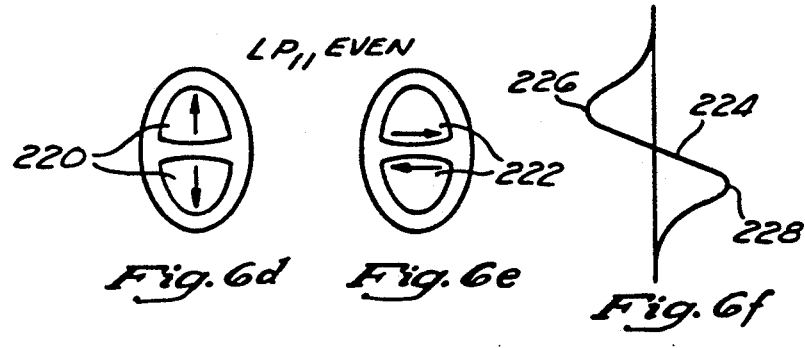
FIGS. 6d and 6e illustrate the electric field patterns for the even $LP_{11}$ propagation modes of the elliptical core optical fiber of FIG. 5.
FIG. 6f is a graph of the electric field amplitude distribution for the even $LP_{11}$ propagation modes of the elliptical core optical fiber of FIG. 5.
Figures 6G, 6H:
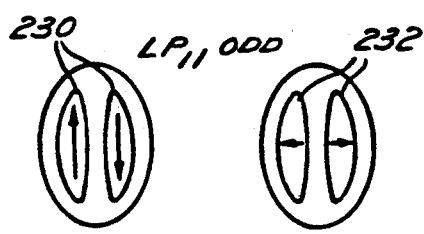
FIGS. 6g and 6h illustrate the electric field patterns for the odd $LP_{11}$ propagation modes of the elliptical core optical fiber of FIG. 5.

FIGS. 6d and 6e illustrates the LP$_{11}$ even modes for the elliptical core fiber 200. As illustrated in FIGS. 6d and 6e, respectively, a vertically polarized even mode electric field pattern 220 and a horizontally polarized even mode electric field pattern 222 are both well-guided by the optical fiber 200. As illustrated in FIG. 6f, the LP$_{11}$ even modes have an electric field amplitude distribution, represented by a curve 224, that has a first maxima 226 proximate to one boundary of the core, and that has a second maxima 228 proximate to an opposite boundary of the core, and wherein the first maxima 226 and the second maxima 228 are 180° out of phase.

The LP$_{11}$ odd polarization mode, represented by an electric field pattern 230 (FIG. 6f), and the LP$_{11}$ odd horizontal polarization mode, represented by an electric field pattern 232 (FIG. 6g), are not guided by the optical fiber 200 when the optical wavelength is selected to be above the second cutoff wavelength $\lambda_{c2even}$. Thus, the optical energy in the LP$_{11}$ odd modes, represented by the field patterns 230 and 232, will not propagate. Thus, rather than providing four degenerate optical communication channels, such as provided by a circular core waveguide or a slightly elliptical core waveguide, the highly elliptical core 202 of the optical fiber 200 provides only two LP$_{01}$ mode propagation channels and two LP$_{11}$ even mode propagation channels. Furthermore, the communication channels are well-defined and stable, and, in the absence of a perturbation in the optical fiber 200, there is no coupling between any of the four channels. Therefore, an optical signal can be launched in the second order LP$_{11}$ is not necessary to avoid exciting the odd lobe patterns of the second order LP$_{11}$ mode because optical energy in those lobe patterns will not propagate. Furthermore, optical energy will not be coupled to the odd lobe patterns.

Because of the stability of the electric field intensity patterns of the LP$_{01}$ mode and the LP$_{11}$ even modes, the performances of fiber optic devices previously developed to utilize the second order LP$_{11}$ mode will be increased. Specific examples of devices utilizing the highly elliptical core waveguide will be set forth hereinafter.

DESCRIPTION OF THE PRESENT INVENTION

Figure 7:
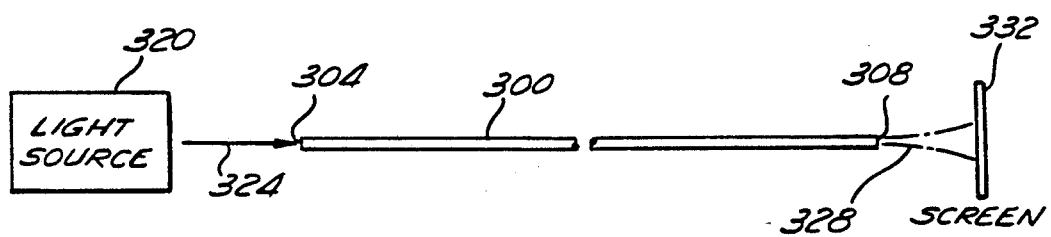
FIG. 7 illustrates an exemplary two-mode optical fiber into which light is introduced to propagate in the $LP_{01}$ and $LP_{11}$ propagation modes.

It has been shown, for example, in U.S. Pat. No. 4,741,586, that when a two-mode optical fiber having a highly elliptical core is excited with an optical signal having a wavelength selected to excite only the LP$_{01}$ mode and the even lobe patterns of the LP$_{11}$ mode, and when the optical signal is applied to the optical fiber such that approximately equal intensities of light are introduced into the LP$_{01}$ mode and the LP$_{11}$ even mode, a periodic pattern in the cross-sectional intensity distribution is created along the length of the optical fiber. This is illustrated in FIG. 7, wherein a two-mode optical fiber 300 having an input end portion 304 and an output end portion 308 is positioned with the input end portion 304 proximate to a laser light source 320. The laser light source 320 generates an optical input signal 324 (represented by an arrow 324) having a wavelength selected to excite the LP$_{01}$ mode and the LP$_{11}$ even mode of the optical fiber 300 without exciting the LP$_{11}$ odd mode, as discussed above. The input end portion 304 is positioned so that the optical input signal 324 from the source 320 is introduced in substantially equal intensities into the LP$_{01}$ mode and the LP$_{11}$ even mode of the optical fiber 300. For example, the centerline of the optical fiber 300 can be offset from the centerline of the optical input signal 324 to provide the desired distribution of the light intensity introduced into the optical fiber 300.

An optical output signal 328 is output from the output end 308 of the optical fiber 300, as represented by an arrow 328. The output end portion 308 of the optical fiber 300 is positioned proximate to a screen 332 so that the output intensity of the light can be observed. Alternatively, the output end portion 308 can be positioned proximate to one or more photodetectors (not shown) so that the output intensity of the light can be converted to an electrical output signal.

The two spatial propagation modes propagate in the optical fiber 300 with different phase velocities to create a periodic pattern in the cross-sectional intensity distribution. This is illustrated in FIG. 8 and in FIGS. 9a-9i, where FIG. 8 represents a portion of the optical fiber 300, and FIGS. 9a-9i represent cross sections of the optical intensity distribution patterns at the locations 9I-9a, 9b-9b, etc., in FIG. 8. In FIGS. 9a-9i, the presence of optical energy in the intensity distribution is represented by the dark portions of the intensity patterns, and the absence of optical energy is illustrated by the light portions of the patterns. FIGS. 9a, 9c, 9e, 9g and 9i illustrate the highly asymmetric intensity distributions that occur at locations where the phase difference between the two modes is N$\pi$, and most of the optical power is concentrated in one-half of the elliptical core. For example, FIG. 9a illustrates the intensity distribution when the phase difference is zero (i.e., 0$\pi$); FIG. 9c illustrates the intensity distribution when the phase difference is $\pi$; and FIG. 9e illustrates the intensity distribution when the phase difference is 2$\pi$. When the phase difference is (N+$\frac{1}{2}$)$\pi$, the intensity distribution is symmetric. FIG. 9b illustrates the symmetric intensity distribution when the phase difference is $\pi/2$, and FIG. 9d illustrates the symmetric intensity distribution when the phase difference is 3$\pi/2$. As illustrated in FIG. 8 and in FIGS. 9a-9i, the mode intensity patterns are periodic and repeat every beat length L$_B$ along the length of the optical fiber 302.

The foregoing phenomenon is the result of the accumulation of a differential phase shift $\phi$ between the two spatial propagation modes due to the difference in the propagation constants of the two modes. The light emitted from the output end portion 308 of the optical fiber 300 provides an output radiation pattern that is responsive to the total accumulated differential phase shift in the optical fiber 300 between the input end portion 304 and the output end portion 308. The output radiation pattern can be observed on the screen 332 to determine the accumulated differential phase shift between the two modes from the input end portion 304 to the output end portion 308. Alternatively, as will be discussed below, the upper half, lower half, or both halves of the output radiation pattern can be detected by photodetectors to determine the differential phase shift.

An optical fiber in which the LP$_{01}$ mode and the LP$_{11}$ even mode are propagating as discussed above can be advantageously used as a two-mode interferometer. See, for example, B. Y. Kim, et al., "Use of Highly Elliptical Core Fibers for Two-Mode Fiber Devices," *OPTICS LETTERS*. Vol. 12, No. 9, September 1987, pp. 729-731, wherein two-mode fiber interferometers analogous to a Mach-Zehnder interferometer are described. Such two-mode fiber interferometers are further described in U.S. patent application Ser. No. 245,717, filed on Sep. 16, 1988, now U.S. Pat. No.

4,915,468) a continuation-in-part of U.S. patent application Ser. No. 017,882, filed on Feb. 20, 1987, now abandoned.

Figure 10:
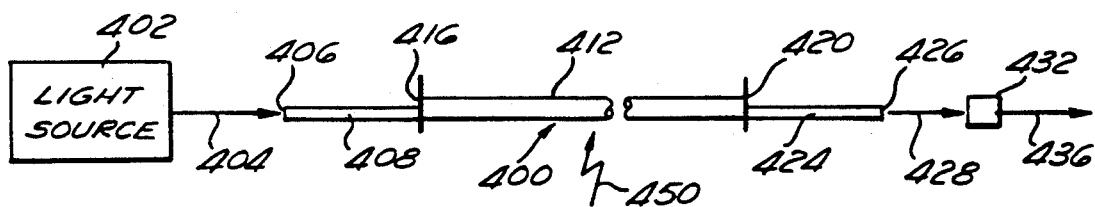
FIG. 10 illustrates an exemplary interferometer that the $LP_{01}$ and $LP_{11}$ propagation modes as the two propagation paths of the interferometer.

As illustrated in FIG. 10, an exemplary two-mode fiber interferometer 400 comprises a light source 402 that provides an output optical signal 404, represented by an arrow 404, that is coupled to an input end 406 of a first single-mode optical fiber 408. The first single-mode optical fiber 408 is coupled to a two-mode optical fiber 412 using a first offset splice 416. Briefly, the offset splice 416 is constructed so that the center of the first single-mode optical fiber 408 is offset from the center of the two-mode optical fiber 412 at the splice 416. Thus, light propagating in the $LP_{01}$ mode of the first single-mode optical fiber 408 is launched asymmetrically into the two-mode optical fiber 412. The relative positions of the centers of the two fibers 408, 412 are adjusted so that the light excites the two modes of the two-mode optical fiber 412 with substantially equal intensities.

A second offset splice 420 couples the two-mode optical fiber 412 to a second single-mode optical fiber 424 such that light from the $LP_{01}$ mode and light from the $LP_{11}$ mode of the two-mode optical fiber 412 are coupled substantially equally into the $LP_{01}$ mode of the second single-mode optical fiber 424. The second single-mode optical fiber 424 has an output end 426 from which an optical output signal 428 is emitted, as represented by an arrow 428.

A detector 432 is positioned proximate to the output end 426 of the second single-mode optical fiber 424 to detect light emitted therefrom. For example, the detector 432 is advantageously a photodetector that provides an electrical output signal on an electrical signal line 436 that varies in accordance with the intensity of the light incident on the detector 432.

Since the light propagating in the second single-mode optical fiber 424 comprises light combined from the $LP_{01}$ mode and the $LP_{11}$ mode of the two-mode optical fiber 412, the emitted light from the output end 428 incident on the detector 432 will have an intensity that is responsive to the relative differential phase shifts of the light in the two propagation modes of the two-mode optical fiber 412. The two-mode optical fiber 412 operates as a sensing region of the interferometer 400 and is subjected to a parameter 450 to be sensed, represented by an arrow 450 in FIG. 10. For example, the parameter to be sensed can be an axial strain, a temperature change, acoustic pressure, or the like. When the parameter 450 is applied to the two-mode optical fiber 412, the propagation characteristics of the two-mode optical fiber 412 are perturbed. The perturbation causes the relative phase shifts of the light in the two modes to change and causes variations in the intensity of the emitted light incident on the detector 432 that in turn cause corresponding changes in the electrical output signal on the line 436. By monitoring the electrical output signal on the line 436, the parameter can be monitored.

It is well known that the detection of small changes in a sensed parameter applied to an interferometer depends upon the phase bias between the two signals in the interferometer. This is illustrated in FIG. 11, which is a graph of optical output intensity I versus the differential phase shift $\phi$ between the two optical signals, which, in the interferometer 400 of FIG. 10, are the $LP_{01}$ mode and the $LP_{11}$ mode signals. As illustrated, the optical output intensity I versus the differential phase shift $\phi$ is a cosinusoidal function 500. When the differential phase shift $\phi$ is zero (0) or an even multiple of $\pi$ (i.e., $\phi = 2N\pi$ for $N = \ldots -2, -1, 0, 1, 2 \ldots$), the optical output intensity I is a maximum as indicated at 504, 508 and 512. When the differential phase shift $\phi$ is an odd multiple of $\pi$ (i.e., $\phi = (2N-1)\pi$ for $N = \ldots -2, -1, 0, 1, 2 \ldots$), the optical output intensity I is a minimum as illustrated at 520, 524 and 528. It can be seen that when the differential phase shift $\phi$ is either an odd or an even multiple of $\pi$, the interferometer 400 is highly insensitive to small changes in the differential phase shift $\phi$ and thus insensitive to small changes in the parameter being sensed. A small change in the differential phase shift $\phi$ causes a correspondingly small change in the output intensity I which is very difficult to detect. Furthermore, because of the symmetry of the cosine function about the minimum and maximum intensities, a change in output intensity caused by an increase in the differential phase shift $\phi$ is indistinguishable from a change in output intensity caused by a decrease in the differential phase shift $\phi$.

The signal fading problem illustrated in FIG. 11 does not occur when the phase bias is at odd multiples of $\pi/2$ (e.g., $-3\pi/2$, $-\pi/2$, $\pi/2$, $3\pi/2$, etc.). This is illustrated in FIG. 11 by an offset in the differential phase shift by an amount $\phi_{BIAS}$ (shown as approximately $\pi/2$) to a bias point 530 on the function 500. It can be seen that at the bias point 530, the output intensity I is at neither a minimum or a maximum. Rather, the output intensity I generated by the function 500 at the bias point 530 is approximately half way between the maximum 508 and the minimum 524. When the differential phase shift $\phi$ increases from the bias point 530, the increase is readily detectable as a decrease in the output intensity I, and when the differential phase shift $\phi$ decreases, the decrease is readily detectable as an increase in the output intensity I.

Although the sensitivity of an interferometer can be increased by selecting a phase bias, as illustrated by the phase bias $\phi_{BIAS}$ in FIG. 11, the phase bias itself is sensitive to environmental parameters, such as temperature, or the like. Thus, the interferometer is subject to signal fading. That is, the phase bias drifts away from the sensitive portion of the function midway between a minimum and a maximum and towards a minimum or a maximum. As set forth in the background of the invention, several approaches have been developed to overcome the signal fading, such as actively stabilizing the phase bias, heterodyning, and using a passive device that produces quadrature phase information. The present invention, described in detail hereinafter, is a passive system that overcomes the signal fading problem by providing two optical signals carrying quadrature phase information using a novel technique.

The use of quadrature phase information is illustrated in FIGS. 12 and 13. Rather than attempting to control the phase bias as discussed above, systems using quadrature phase information provide two output signals in quadrature with each other. For example, FIG. 12 illustrates a cosinusoidal function 600 that represents a first signal responsive to the differential phase shift $\phi$, as before. FIG. 13 illustrates a sinusoidal function 610 that represents a second signal responsive to the differential phase shift $\phi$ that is displaced in phase by 90° ($\pi/2$) from the first signal represented by the cosinusoidal function 600. It can be seen that when the cosinusoidal function 600 is at a maximum or minimum corresponding to a phase difference $\phi$ where the first signal is least sensitive to changes in the differential phase difference $\phi$, the sinusoidal function 610 represents a phase difference $\phi$ where the sensitivity to changes in the phase difference $\phi$ is a maximum. Similarly, when the second signal is least sensitive to changes in the differential phase difference, as represented by a minimum or a maximum of the sinusoidal function 610, the first signal is most sensitive to changes in the differential phase difference. By using the cosinusoidal function 600 in combination with the sinusoidal function 610, the differential phase shift $\phi$ can be readily evaluated in a conventional manner known to those skilled in the art. (See, for example, David W. Stowe, et al., "Demodulation of Interferometric Sensors Using a Fiber-Optic Passive Quadrature Demodulator," *JOURNAL OF LIGHTWAVE TECHNOLOGY*, Vol. LT-1, No. 3, September 1983, pp. 519–523.)

The present invention is a new system for generating quadrature output signals in an interferometer, and the like. The present invention utilizes the little known phenomenon called the "Guoy effect" first discovered experimentally by G. Guoy in 1890. Basically, Guoy's description of the effect is that an optical beam with any reasonably simple cross section will acquire an extra half-cycle (i.e., 180° or $\pi$) of phase shift in passing through a focal region of the beam. See, for example, Anthony E. Siegman, "LASERS," University Science Books, Mill Valley, Calif., ISBN 0-935702-11-5, Chapter 17, pp. 682–685 (1986).

Applicants have discovered that the phase shift that occurs in accordance with the Guoy effect can be used in combination with an interferometer, or other apparatus in which two optical propagation modes are combined, to obtain a non-fading signal responsive to variations in the phase difference between the two modes.

As set forth in the Siegman reference, the Guoy effect introduces an additional phase shift to a Gaussian beam passing through a focal region or a beam waist. The Gaussian modes ($TEM_{lm}$) of a beam diverging away from its beam waist can be expressed as:

$$E_{lm}(x,y,z) = \quad (6)$$

$$A_{lm}(x,y,z)\exp\left\{ i\left[ -kz - \frac{k(x^2 + y^2)}{2R(z)} + (1 + m + 1)\eta(z) \right] \right\}$$

where $A_{lm}(x,y,z)$ is the amplitude, k is the wavenumber, and the beam waist is at $z+0$. $R(z)$ and $\eta(z)$ are given by:

$$R(z) = z(1 + z_0^2/z^2) \quad (7)$$

$$\eta(z) = \tan^{-1}(z/z_0) \quad (8)$$

where $z_0 - (\frac{1}{2})w_0^2 k$ is the minimum beam radius for the $TEM_{00}$ mode at $z=0$, at which the optical field amplitude is down by $1/e$ compared to its value at its maximum. It should be noted that the value of $\eta(z)$ becomes $\pi/2$ when $z >> z_0$, leading to differential phase shifts of $\pi/2$ between Gaussian modes having a difference of 1 between their respective values of $m+1$ as the beam makes a transition from its waist to the far field radiation region. (For example, the $TEM_{00}$ mode has a value of $m+1=0$, and the $TEM_{10}$ has a value of $m+1=1$, thus having a difference of 1 between the two values of $m+1$.) This mode number dependent phase shift provides a reliable way of obtaining quadrature optical phase information in interferometric systems when two spatial modes propagating away from a beam waist are used as two arms of an interferometer.

Figure 14:
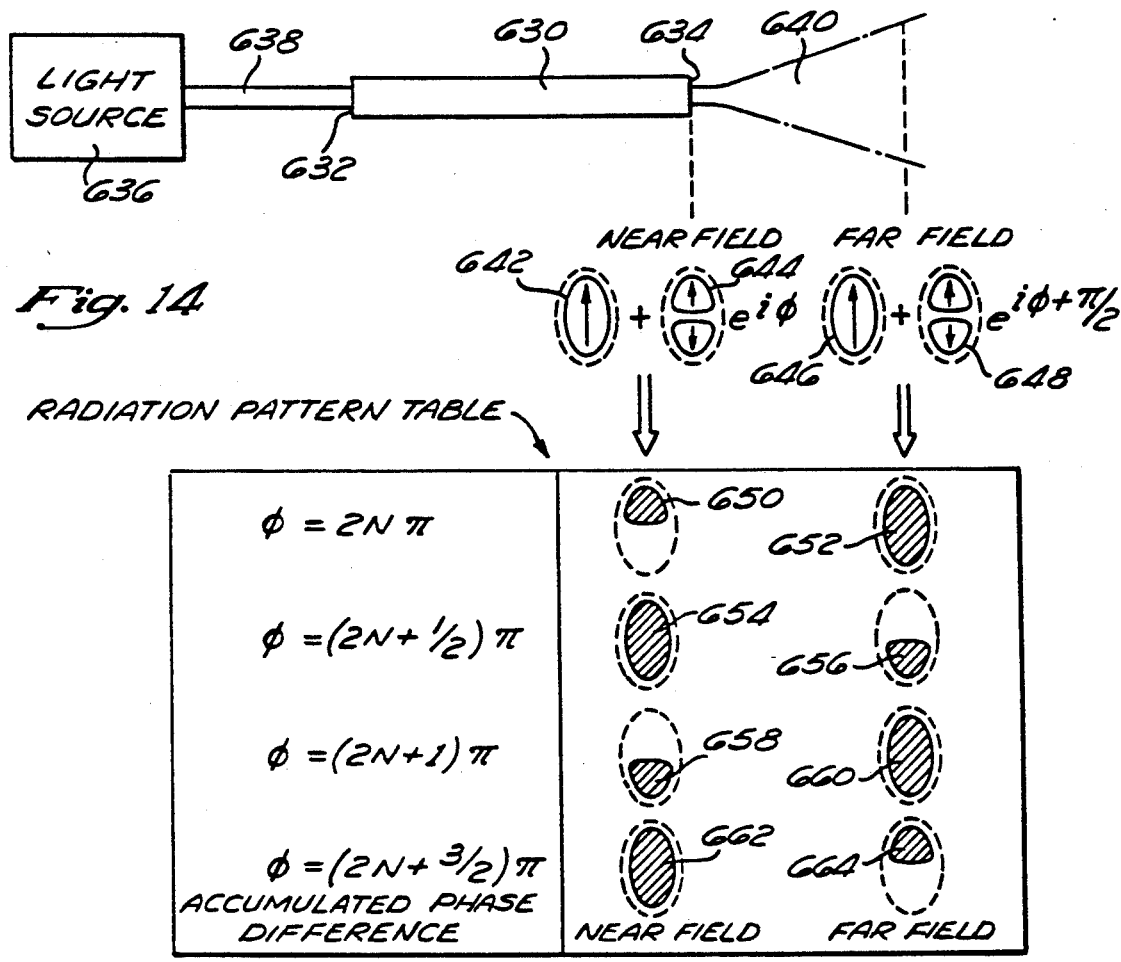
FIG. 14 illustrates the modal interference patterns of a highly elliptical core two-mode optical fiber at the near field and the far field showing the relative phase shift between the two fields.

The foregoing is illustrated in FIG. 14 for an exemplary two-mode optical fiber 630 having an input end 632 and an output end 634. A light source 636 generates an optical input signal 638 that is applied to the input end 632 such that light propagates in the optical fiber 630 in the $LP_{01}$ and the $LP_{11}$ spatial propagation modes to the output end 634 where it is radiated as a beam 640. As previously discussed, the two guided spatial modes (the $LP_{01}$ and the $LP_{11}$ modes) in a two-mode optical fiber, such as the fiber 630, can be accurately approximated as the Gaussian $TEM_{00}$ and $TEM_{10}$ modes. The radiating output from the output end 634 of the optical fiber 630 provides an ideal medium for implementing the $\pi/2$ Guoy phase shift for quadrature phase detection. The output end 634 represents the waist or the focal point of the beam 640, and as the $LP_{01}$ and $LP_{11}$ modes radiate away from the output end 634, a $\pi/2$ phase difference is introduced between the two modes in accordance with the Guoy effect. As further illustrated in FIG. 14, the near field radiation pattern at the output end 634 comprises an $LP_{01}$ mode portion 642 and an $LP_{11}$ mode portion 644, the $LP_{11}$ mode portion having a phase difference $\phi$ with respect to the $LP_{01}$ mode portion. The two mode portions are superimposed to provide a composite radiation pattern illustrated in the radiation pattern table in FIG. 14. For example, when the accumulated phase difference between the two modes of the light propagating through the optical fiber 630 is equal to $2N\pi$, the near field radiation pattern comprises light in the upper lobe, as illustrated by a pattern 650. At a far field region displace away from the output end 634 of the optical fiber 630, an additional $\pi/2$ phase difference is introduced between the two modes in accordance with the Guoy effect. Thus, as illustrated by a radiation pattern 652, the light is distributed between the upper and lower lobes of the radiation pattern.

When the light at the near field has a phase difference $\phi$ of $(2N+\frac{1}{2})\pi$ between the two modes, as illustrated by a pattern 654, the light at the far field will have a phase difference of $(2N+1)\pi$ between the two modes, as illustrated by a pattern 656. Similarly, when the light at the near field has a phase difference $\phi$ of $(2N+1)\pi$ between the two modes, as illustrated by a pattern 658, the light at the far field will have a phase difference of $(2N+3/2)\pi$ between the two modes, as illustrated by a pattern 660. Finally, when the light at the near field has a phase difference of $(2N+3/2)\pi$ between the two modes, as illustrated by a pattern 662, the light at the far field has a phase difference of $2(N+1)\pi$ between the two modes, as illustrated by a pattern 664. Thus, it can be seen that the interference pattern of the light at the near field will always be in phase quadrature with the interference patterns of the light at the far field. The invention described hereinafter utilizes this relationship between the near field and far field radiation patterns to obtain a pair of optical output signals in phase quadrature from an interferometer.

As illustrated in FIG. 14, the near field radiation pattern occurs directly at the output end 634 of the two-mode optical fiber 630. A detector (not shown) can be positioned directly on the output end 634 of the two-mode optical fiber 630 to receive the light emitted from either the upper lobe or the lower lobe of the near field radiation pattern, with a second detector (not shown) positioned to receive the far field radiation pattern. In a preferred embodiment of the present invention, a detector is not positioned directly on the output end 634. Rather, both detectors are displaced from the output end 634. FIG. 15 illustrates a preferred system for obtaining the two signals in phase quadrature utilizing the Guoy effect. A two-mode optical fiber 700 having a highly elliptical core has a first end 702 that is positioned proximate to the output of a light source 704 so that an optical signal 706 from the light source 704 is caused to propagate in the two-mode optical fiber 700. For example, the two-mode optical fiber 700 is advantageously a fiber available from Polaroid Corporation that has a core with a major axis length of 4.1 microns and a minor axis length of 2.2 microns. The optical fiber 700 has an $LP_{11}$ mode cutoff wavelength of 633 nanometers. The light source 704 is advantageously an Ar-ion laser operating at a wavelength of 514.5 nanometers.

The optical signal 706 from the light source 704 is introduced into the optical fiber 700 so that the light propagates in the $LP_{01}$ mode and the $LP_{11}$ mode with substantially equal intensities. This is accomplished, for example, by offsetting the center of the input end 702 with respect to the output of the light source 704 in a conventional manner.

The two-mode optical fiber 700 has an output end 710 that provides an output signal 712. The output end 710 is positioned proximate to a converging lens 714, such as a 20× microscope objective. The output signal 712 is converged by the lens 714 and is split into a first beam 720 and a second beam 722 by a conventional beam splitter 724. A first imaging lens 730 is positioned at the waist of the first beam 720 to image the near field pattern of the first beam onto a first screen 732. A second imaging lens 740 is positioned in the path of the second beam 722 far away from the waist of the second beam 722 to image the far field pattern of the second beam 722 onto a second screen 742. The size of the far field pattern projected onto the second screen 742 is adjusted by positioning the second imaging lens 740 with respect to the beam splitter 724 and the second screen 742.

A short section of the two-mode optical fiber 700 is stretched to vary the length of the fiber 700 and thus vary the accumulated phase difference between the $LP_{01}$ mode and the $LP_{11}$ mode. The patterns on the first screen 732 and the second screen 742 observed while stretching the fiber 700 will change in accordance with the accumulated phase difference as discussed above in connection with FIG. 14.

It can be shown that the interference pattern on the first screen 732 corresponds to the near field pattern at the output end 710 of the optical fiber 700, and the interference pattern on the second screen 742 corresponds to the far field pattern, as described above. Thus, the interference patterns on the two screens 732, 742 are in phase quadrature.

The basis for the $\pi/2$ phase difference between the two interference patterns can be understood by referring first to the output end 710 of the optical fiber 700. The phase difference between the two modes at the output end 710 will have a value of $\phi_{OUT}$. The value of $\phi_{OUT}$ does not need to be known in order to show that the interference pattern on the first screen 732 corresponds to the interference pattern at the output end 710 and that the interference pattern on the second screen 742 corresponds to the far field pattern.

As illustrated in FIG. 15, the converging lens 714 is positioned sufficiently far away from the output end 710 of the optical fiber 700 such that it is in the far field region of the light. Thus, in accordance with the Guoy effect, the phase difference between the two modes accumulates an additional $\pi/2$ phase difference as the light propagates from the output end 710 to the converging lens 714. The light at the converging lens 714 will therefore have a phase difference of $\phi_{OUT}+\pi/2$ between the two modes.

The light passing through the converging lens 714 begins to converge. The portion of the light forming the second beam 722 following the beam splitter 724 has a first waist 750 following which it diverges as it propagates to the second imaging lens 740, which is positioned sufficiently far from the waist 750 so as to be in the far field region of the light with respect to the waist 750. As the light in the second beam 722 propagates from the far field region at the converging lens 714 to the waist 750, an additional $\pi/2$ phase difference accumulates between the two modes in accordance with the Guoy effect. Furthermore, as the light in the second beam 722 propagates from the first waist 750 to the second imaging lens 740, an additional $\pi/2$ phase difference accumulates, for a total additional phase difference of $\pi$ accumulating as the light propagates between the converging lens 714 and the second imaging lens 740. Finally, as the light in the second beam 722 propagates from the second imaging lens 740 to the second screen 742, it first converges to form a second waist 752 and then diverges to a form a far field pattern on the second screen 742. The light in the two modes accumulates an additional $\pi/2$ phase difference between the second imaging lens and the second waist 752 and an additional $\pi/2$ phase difference between the second waist 752 and the second screen 742. The total additional accumulated phase difference between the output end 710 and the second screen 740 is $\pi/2+2\pi$, which is equivalent to $\pi/2$. Thus, the interference pattern formed on the second screen 740 will represent $\phi_{OUT}+\pi/2$, which is the same relative phase difference between the two modes as the phase difference at the first far field region (i.e., at the location of the converging lens 714.

Now following the optical path from the output end 710 of the optical fiber 700 to the first screen 732, the light in the two modes accumulates an additional phase difference of $\pi/2$, as discussed above. The light forming the first beam 720 converges to a first beam waist 760 at the location of the first imaging lens 730 so that the light accumulates an additional $\pi/2$ phase difference between the two modes in accordance with the Guoy effect. The first imaging lens 730 at the first beam waist 760 of the first beam 720 causes a second beam waist 762 to be formed as the first beam 720 first converges and then diverges toward the first screen 732. An additional $\pi/2$ phase difference between the two modes accumulates as the light propagates from the first imaging lens 730 to the second beam waist 762, and a further additional $\pi/2$ phase difference accumulates as the first beam propagates from the second beam waist to the first screen 732. The total additional accumulated phase difference from the output end 710 of the optical fiber 700 to the first screen 732 is $2\pi$, and the phase difference between the two modes in the interference pattern on the first screen 732 is $\phi_{OUT}+2\pi$, which is equivalent to $\phi_{OUT}$. Thus, the interference pattern on the first screen 732 corresponds to the near field pattern at the output end 710 of the optical fiber 700.

It can be seen that by positioning the lens 714, 730 and 740 as illustrated in FIG. 15, the near field interference pattern and the far field interference pattern can be observed without having to position a screen on the output end 710 of the optical fiber 700. It can further be seen that the interference patterns displayed on the two screens are in phase quadrature with respect to each other.

FIG. 16 illustrates the system of FIG. 15 with the first screen 732 replaced by a first detector 770 and a second detector 772, positioned proximate to the upper lobe and the lower lobe, respectively, of the intensity pattern of the first beam 720. Similarly, the second screen 742 is replaced by a third detector 774 and a fourth detector 776, positioned proximate to the upper lobe and lower lobe, respectively, of the intensity pattern of the second beam 722. The electrical outputs of the first and second detectors 770, 772 are provided as inputs to a first differential amplifier 778 that provides an electrical output signal cos $\phi$ on a signal line 780 that is responsive to the intensities in the two lobes and thus responsive to the phase difference between the two modes in the first beam 720. Similarly, the electrical outputs of the third and fourth 774, 776 are provided as inputs to a second differential amplifier 782 that provides an electrical output signal sin $\phi$ on a signal line 784 that is responsive to the intensities in the two lobes and thus responsive to the phase difference between the two modes in the second beam 722. The magnitudes of the electrical signals on the two lines are monitored to verify that the interference patterns are in phase quadrature.

Figure 17:
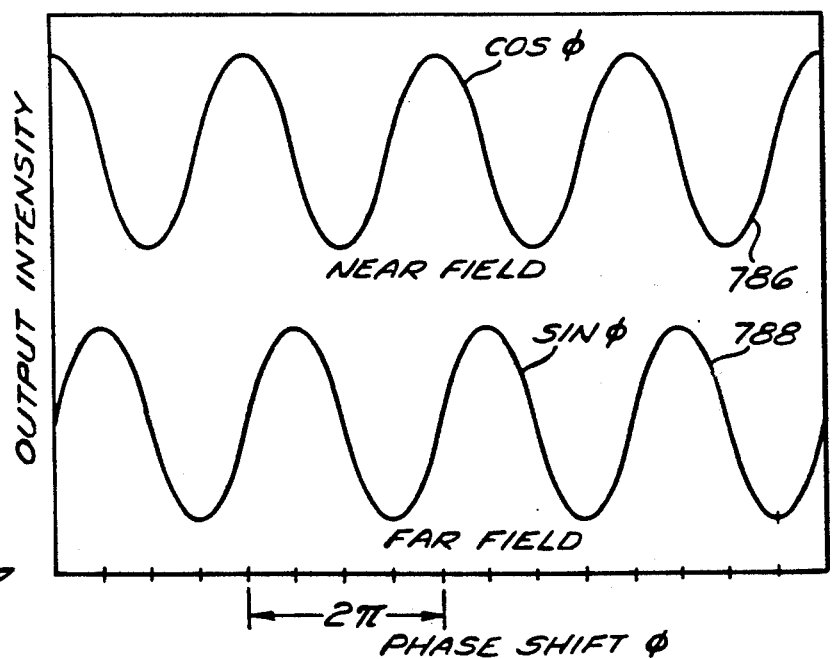
FIG. 17 illustrates the electrical output signals produced by the differential amplifiers connected to the detectors in FIG. 16.

FIG. 17 illustrates the electrical output signals measured in an experimental system constructed in accordance with FIG. 16. A first graph 786 represents the intensity of the electrical output signal on the first signal line 780 from the first differential amplifier 778 and thus represents the cos $\phi$ signal corresponding to the differential intensity of the light in the two lobes of the near field pattern. A second graph 788 represents the intensity of the electrical output signal on the second signal line 784 from the second differential amplifier 782, and thus represents the sin $\phi$ signal corresponding to the differential intensity of the light in the two lobes of the far field pattern. The horizontal axes of the two graphs represents the phase shifts caused by stretching the optical fiber 700. The vertical axis represents the intensity of the output signals from the differential amplifiers 778, 782. (It should be noted that the amplitudes of the two signals are shown as AC values on the graphs 786, 788 in order to show the phase relationships between the minima and the maxima of the two signals. No DC intensity levels are intended to be shown by the vertical positioning of the two graphs 786, 788 with respect to each other.) It can be seen that when the differential intensity of the light in the near field is at a maximum or minimum, as represented by a maximum or minimum of the first graph 786, the differential intensity of the light in the far field, as represented by the second graph 786, is substantially half way between a maximum or a minimum, and vice versa. Thus, the interference patterns are shown to be in phase quadrature.

Figure 18:
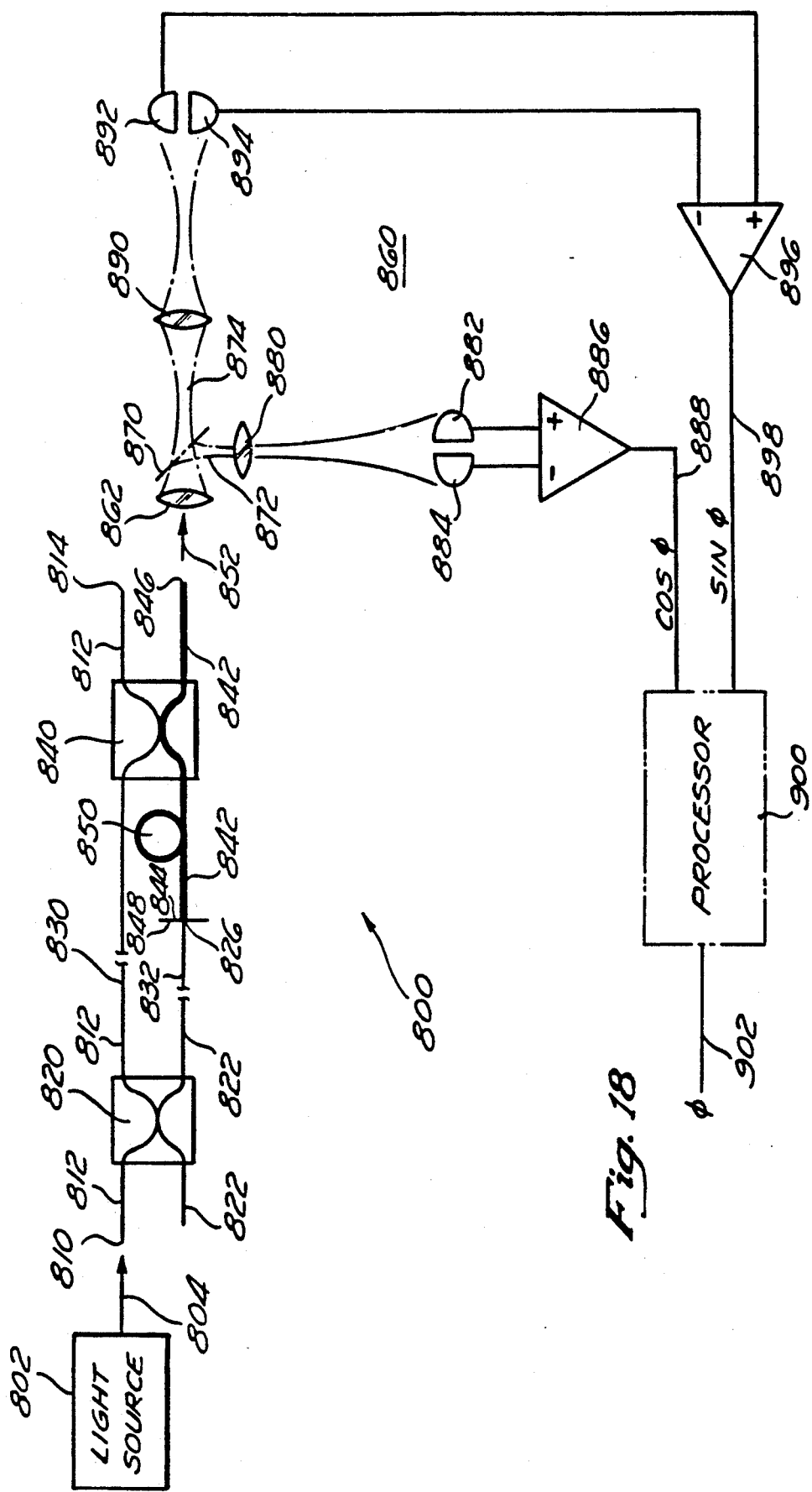
FIG. 18 illustrates the quadrature phase detector of the present invention incorporated into a Mach-Zehnder interferometer.

FIG. 18 illustrates an exemplary embodiment of a Mach-Zehnder interferometer 800 utilizing the present invention. As illustrated, the interferometer 800 includes a light source 802 that produces an input optical signal 804 that is coupled into an input end 810 of a first single-mode optical fiber 812 using a focusing lens (not shown), or in another conventional manner.

The first single-mode optical fiber 812 has a second end 814. A directional coupler 820 is formed on the first single-mode optical fiber 812 between the first end 810 and the second end 814. The directional coupler 820 is preferably constructed in accordance with U.S. Pat. No. 4,536,058, or an equivalent. The directional coupler 820 couples the first single-mode optical fiber 812 to a second single-mode optical fiber 822 which has a first end 824 and a second end 826.

The directional coupler 820 is constructed so that the light propagating in the first single-mode optical fiber 812 from the light source 802 is divided substantially equally so that approximately 50 percent of the light continues to propagate in the first single-mode optical fiber 812 and approximately 50 percent is coupled to the second single-mode optical fiber 822 to propagate therein. The portion of the first single-mode optical fiber 812 following the directional coupler 820 comprises a first sensing arm 830 of the Mach-Zehnder interferometer 800, and the portion of the second single-mode optical fiber 822 comprises a second sensing arm 832 of the Mach-Zehnder interferometer 800. For example, one of the sensing arms 830, 832 can be positioned so as to be perturbed by a parameter to be sensed (e.g., temperature, acoustic pressure, strain, etc.), while the other arm is protected from the perturbation and thus serves as a reference arm.

Following the sensing arm 830, a mode selective directional coupler 840 is formed on the first single-mode optical fiber 812. The mode selective directional coupler 840 comprises a two-mode optical fiber 842 which is juxtaposed with the first single-mode optical fiber 812 to provide optical coupling therebetween. An exemplary mode selective directional coupler is described, for example, in U.S. Pat. No. 4,828,350. The two mode optical fiber 842 has a first end 844 and a second end 846. The first end 844 of the two-mode optical fiber 842 is butt spliced to the second end 826 of the second single-mode optical fiber 822 at a splice 848. Preferably, the cores of the second single-mode optical fiber 822 and the two-mode optical fiber 842 are aligned at the splice 848 such that substantially all the light propagating in the second single-mode optical fiber 822 is coupled to the $LP_{01}$ mode of the two-mode optical fiber 842. In order to eliminate any light in the $LP_{11}$ mode of the two-mode optical fiber 842, a portion of the two-mode optical fiber 842 between the splice 848 and the mode selective directional coupler 840 is formed into an $LP_{11}$ mode stripper 850 which is advantageously a several loops of the two-mode optical fiber 842 having a tight radius.

As described in U.S. Pat. No. 4,828,350, the mode selective directional coupler 840 is constructed so that substantially 100 percent of the light in the first single-mode optical fiber 812 is coupled to the $LP_{11}$ mode of the two-mode optical fiber 842 to propagate to the second end 846. Substantially no coupling occurs from the $LP_{01}$ mode of the two-mode optical fiber 842 to the first single-mode optical fiber 812. Thus, the light propagating in the $LP_{01}$ mode of the two-mode optical fiber 842 comprises the light that propagated through the second sensing arm 832 of the Mach-Zehnder interferometer 800, while the light propagating in the $LP_{11}$ mode of the two-mode optical fiber 842 comprises the light that propagated through the first sensing arm 830 of the Mach-Zehnder interferometer 800. The light propagating in the two modes of the two-mode optical fiber 842 to the output end 846 has a relative phase difference that varies in accordance with the difference perturbations applied to the sensing arms 830, 832. The combined light is radiated from the second end 846 as an output signal 852.

As further illustrated in FIG. 18, a quadrature phase detector 860, constructed in accordance with FIG. 16, is positioned proximate to the second end 846 of the two-mode optical fiber 842 to receive the output signal 852 and generate a first output signal and a second output signal that are in phase quadrature. The quadrature phase detector 860 comprises a converging lens 862 that is positioned in the far field region of the output signal 852. A beam splitter 870 forms a first beam 872 and a second beam 874 from the output signal 852. The first beam 872 is imaged by a first imaging lens 880 to form a near field radiation pattern which is incident onto a first detector 882 and a second detector 884. The first and second detectors 882, 884 are positioned to receive light in the upper and lower halves of the near field radiation pattern. The outputs of the first and second detectors 882, 884 are provided as inputs to a first differential amplifier 886 that provides an output signal on a signal line 888 that is responsive to the difference in the intensities of the upper and lower halves of the near field radiation pattern and thus responsive to the phase difference between the light in the $LP_{01}$ and $LP_{11}$ modes at the near field. The output signal on the line 888 is designated as the cos $\phi$ for reference.

The second beam 874 is imaged by a second imaging lens 890 to form a far field radiation pattern which is incident onto a third detector 892 and a fourth detector 894. The third and fourth detectors 892, 894 are positioned to receive light in the upper and lower halves of the far field radiation pattern. The outputs of the third and fourth detectors 892, 894 are provided as inputs to a second differential amplifier 896 that provides an output signal on a signal line 898 that is responsive to the difference in the intensities of the upper and lower halves of the far field radiation pattern and thus responsive to the phase difference between the light in the $LP_{01}$ and $LP_{11}$ modes at the far field. Since the output signal on the signal line 898 is in phase quadrature with the cos $\phi$ output signal on the signal line 888, it is designated as sin $\phi$.

The cos $\phi$ output on the signal line 888 and the sin $\phi$ output on the signal line 898 are provided as inputs to a processor 900 (shown in phantom lines) which processes the two quadrature signals in a conventional manner and provides an output signal on a line 902. The output signal $\phi$ is responsive to the phase difference between the two signals in the two sensing arms 830, 832 in the interferometer 800.

FIG. 19 illustrates the use of the quadrature phase detector system of the present invention to eliminate signal fading in a coherent homodyne communication system 950. The system 950 comprises a single-mode optical fiber 952 via which an incoming optical communication signal is provided as an input to the system 950 from a signal source 954 (shown in dashed lines). The incoming signal has a known optical frequency. Voice or data information is communicated by phase modulating the optical communication signal at the signal source 954.

A local oscillator 960 generates a local optical signal that operates at substantially the same optical frequency as the incoming optical communication signal. For example, the local oscillator 960 is preferably a laser light source that provides a laser output signal 962 that has a very narrow bandwidth.

The local optical signal 962 is provided as an input to a first end 964 of a two-mode optical fiber 966. The first end 964 of the two-mode optical fiber 966 is aligned with the output of the local oscillator 960 so that substantially all of the local optical signal is coupled to the $LP_{01}$ mode of the two-mode optical fiber 966. A mode stripper 968 is formed on the two-mode optical fiber 966 to strip off any light that may be coupled to the $LP_{11}$ mode of the two-mode optical fiber 966.

The single-mode optical fiber 952 and the two-mode optical fiber 966 are formed into a mode selective directional coupler 970 that is preferably constructed in accordance with U.S. Pat. No. 4,828,350, as described above. As discussed above, the light propagating in the single-mode optical fiber 952 is coupled to the $LP_{11}$ mode of the two-mode optical fiber 966 while the light propagating in the $LP_{01}$ mode of the two-mode optical fiber 966 remains in the $LP_{01}$ mode. The two modes have an optical phase difference that varies in accordance with the voice or data information transmitted by the signal source 954. Thus, the near field and far field interference patterns will vary in accordance with the transmitted voice or data information. The two mode optical fiber 966 has a second end 980 from which an output signal 982 is radiated.

The phase information is detected by a quadrature phase detector 860' that is constructed in accordance with and operates in the same manner as the quadrature phase detector 860 of FIG. 18. In FIG. 19, the elements of the quadrature phase detector 860' have been given the same numbers as in FIG. 18, and the same description is applicable. The cos $\phi$ and the sin $\phi$ are processed in a processor 900'. The processor 900', provides an output signal on a signal line 902' that represents the original voice or data information transmitted by the signal source 954.

While described above in connection with an exemplary interferometer and an exemplary communication system, it should be understood that the passive quadrature detector of the present invention can be used in combination with other systems wherein it is necessary to determine the optical phase difference between two signals.

What is claimed is:

1. An apparatus for detecting a phase difference between first and second optical signals, comprising:
    a multi-mode optical fiber;
    means for coupling one of said first and second optical signals to a first mode of said multi-mode optical fiber and the other of said first and second optical signals to a second mode of said multi-mode optical fiber, said first and second modes of said multi-mode optical fiber interfering within said multi-mode optical fiber in response to said phase difference between said first and second signals, said multi-mode optical fiber providing an output optical signal having an intensity pattern responsive to said phase difference between said first and second optical signals, said intensity pattern further representing a phase difference between said first and second modes of said output optical signal;
    means for detecting a near-field intensity pattern that represents said intensity pattern of said output optical signal; and
    means for detecting a far-field intensity pattern that is in quadrature with said near-field intensity pattern, said far-field intensity pattern representing a phase difference between said first and second modes that differs by 90° ($\pi/2$ radians) from said phase difference between said first and second modes of said output optical signal represented by said near-field intensity pattern.

2. The apparatus as defined in claim 1, wherein said 90° difference in said phase differences is caused by the Guoy effect.

3. The apparatus as defined in claim 1, wherein said first and second optical signals propagate in respective first and second propagation paths, and wherein said phase difference is caused by a difference in the propagation path lengths of said first and second propagation paths.

4. The apparatus as defined in claim 3, wherein said first and second propagation paths comprise first and second arms of a Mach-Zehnder interferometer.

5. The apparatus as defined in claim 3, wherein said first and second propagation paths comprise first and second spatial propagation modes of an optical fiber.

6. The apparatus as defined in claim 1, wherein said first optical signal comprises a communication signal having a known optical frequency, said communication signal representing information by shifts in the phase of said first optical signal, wherein said second optical signal comprises an optical signal having an optical frequency substantially equal to said known optical frequency, and wherein said output optical signal has an intensity pattern that is responsive to said shifts in the phase of said first optical signal.

7. An apparatus, comprising:
an interferometer having an output for producing an output signal;
a detection device for quadrature phase detection of said output signal, said detection device including first and second detectors positioned to detect said output signal at first and second locations, respectively, said first and second locations relatively positioned to provide a Guoy phase shift of $N\pi/2$ (where N is an odd integer) for said output signal at said first and second detectors, respectively.

8. A method of sensing, comprising:
detecting a single interferometer output signal at first and second locations so as to provide first and second output signals having a phase bias therebetween which is independent of interference between light waves comprising said interferometer output signal; and
selecting said locations such that said phase bias is fixed and insensitive to environmental influence.

9. A method of sensing, comprising:
interfering two optical signals;
detecting interference between said signals at first and second locations so as to provide first and second output signals having a phase bias therebetween which is independent of the interference between the signals; and
selecting the locations such that said phase bias is fixed and insensitive to environmental influence, wherein said selecting step comprises selecting said first location to be at a near field pattern of the optical signals and selecting said second location to be at a far field pattern of the optical signals.

10. A method of sensing, comprising:
interfering two optical signals;
detecting interference between said signals at first and second locations so as to provide first and second output signals having a phase bias therebetween which is independent of the interference between the signals; and
selecting the locations such that said phase bias is fixed and insensitive to environmental influence, wherein said selecting step comprises selecting two locations to provide a Guoy effect phase shift between the two locations.

11. The apparatus of claim 9, wherein said phase bias is 90 degrees.

12. An apparatus comprising:
an interferometric device which provides interference between interfering light waves;
a first detector for detecting a single optical output signal comprised of said light waves; and
a second detector for detecting said single optical output signal, said first and second detectors being disposed such that said optical output signal at said second detector is shifted in phase relative to said optical output signal at said first detector to provide a phase bias between said optical output signal at said first detector and said optical output signal at said second detector, said first and second detectors being disposed such that said phase bias is stable and insensitive to environmental influence.

13. An apparatus comprising:
an interferometric device having an optical output signal which is responsive to interference between interfering optical signals;
a first detector for detecting said optical output signal; and
a second detector for detecting said optical output signal, said first and second detectors being disposed such that said optical output signal at said second detector is shifted in phase relative to said optical output signal at said first detector to provide a phase bias between said optical output signal at said first detector and said optical output signal at said second detector, said first and second detectors being disposed such that said phase bias is stable and insensitive to environmental influence, wherein said phase bias is caused by a Guoy effect phase shift.

14. An apparatus comprising:
an interferometric device having an optical output signal which is responsive to interference between interfering optical signals;
a first detector for detecting said optical output signal; and
a second detector for detecting said optical output signal, said first and second detectors being disposed such that said optical output signal at said second detector is shifted in phase relative to said optical output signal at said first detector to provide a phase bias between said optical output signal at said first detector and said optical output signal at said second detector, said first and second detectors being disposed such that said phase bias is stable and insensitive to environmental influence, wherein said first detector is disposed in a near field pattern of said optical output signal and said second detector is disposed in a far field pattern of said optical output signal.

15. The apparatus of claim 13, wherein said interferometric device comprises a two-mode optical fiber.

16. The apparatus of claim 13, wherein said interferometric device comprises a local oscillator which modulates the phase of one of said optical signals at a predetermined frequency.

17. The apparatus of claim 13, wherein said first and second detectors generate first and second detector signals which are in phase quadrature, and wherein said interferometric device comprises a processor for processing said detector signals to measure said interference between said optical signals.

18. A method for detecting light output from an interferometer, said method comprising:
   detecting said light at plural locations; and
   utilizing the Guoy effect to produce a phase difference between light at said first location and light at said second location.

19. The method of claim 18, wherein said phase difference is an odd multiple of $\pi/2$, and said detecting step comprises generating detector signals, said method additionally comprising the step of processing the detector signals to measure changes in said light.

20. The method of claim 18, wherein the detecting step comprises (a) splitting the light into plural beams, (b) directing the plural beams onto plural detectors, respectively, and (c) arranging the detectors such that one is in a near field pattern of said light and another is in a far field pattern of said light.

* * * * *